Jan. 13, 1953     R. F. EDDY ET AL     2,625,120
AUTOMATIC FROZEN CONFECTION MAKING APPARATUS
Filed July 1, 1950     9 Sheets-Sheet 1
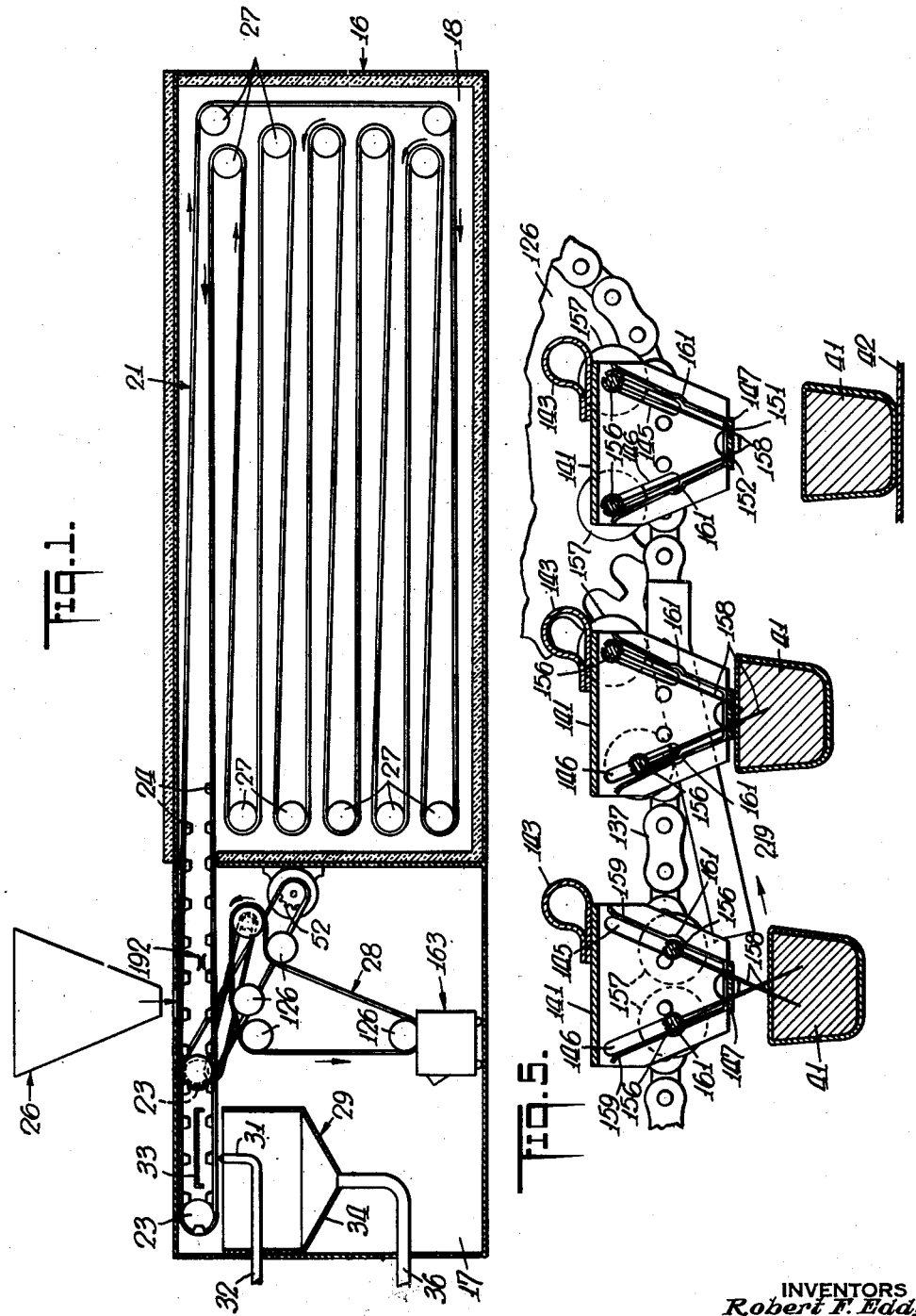
INVENTORS
Robert F. Eddy
Allan F. Eddy
BY
Richard J. Newbury
ATTORNEY

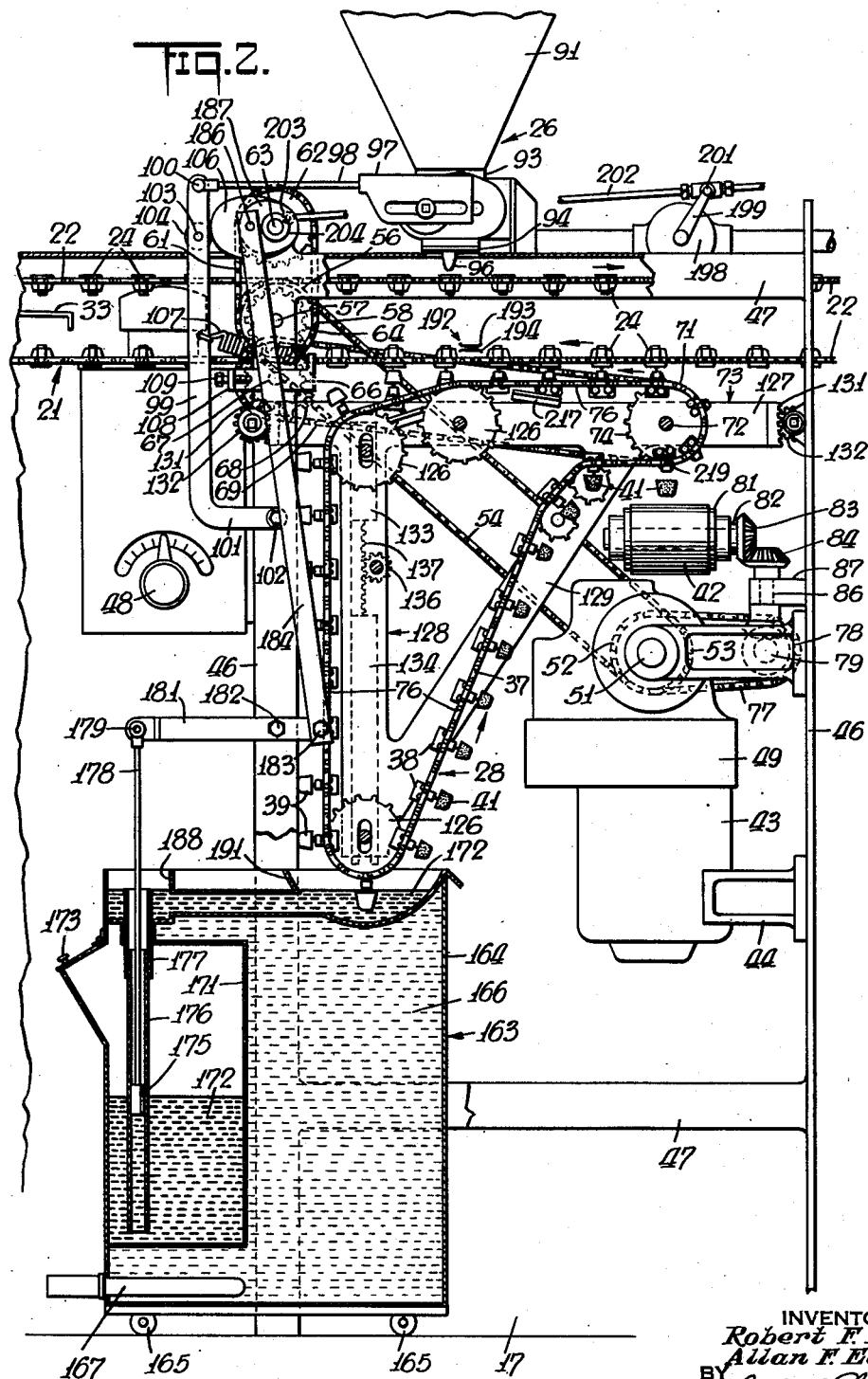

Jan. 13, 1953   R. F. EDDY ET AL   2,625,120
AUTOMATIC FROZEN CONFECTION MAKING APPARATUS
Filed July 1, 1950   9 Sheets-Sheet 3
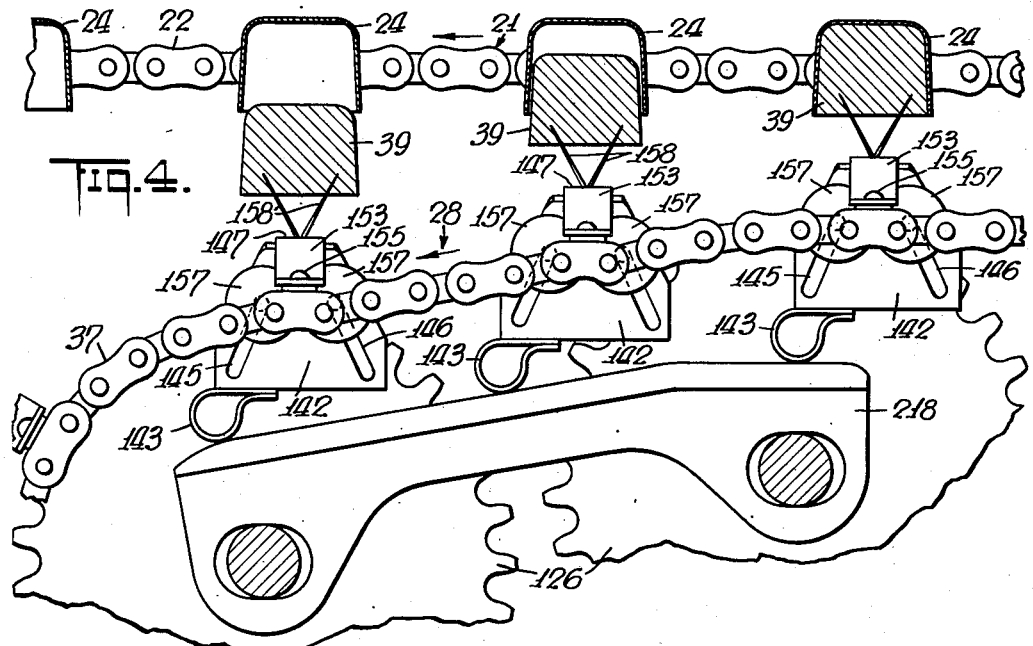
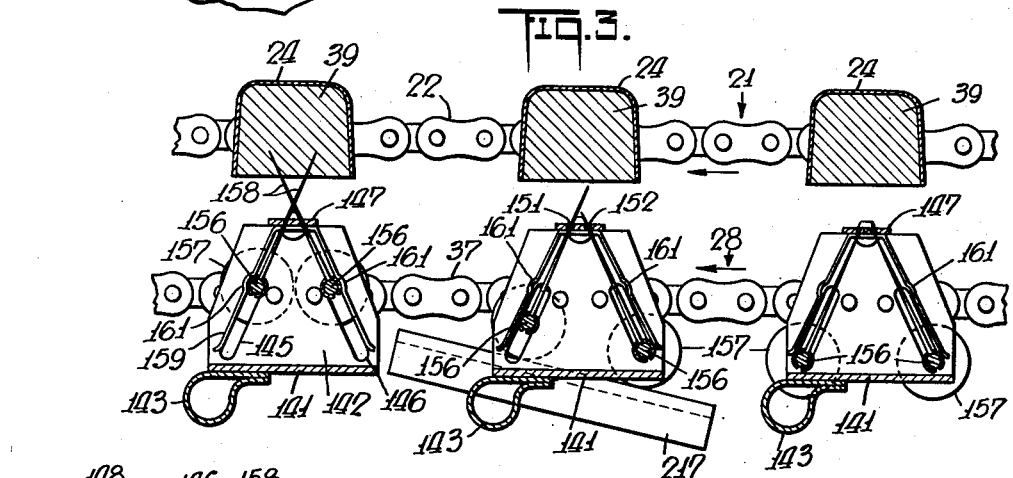
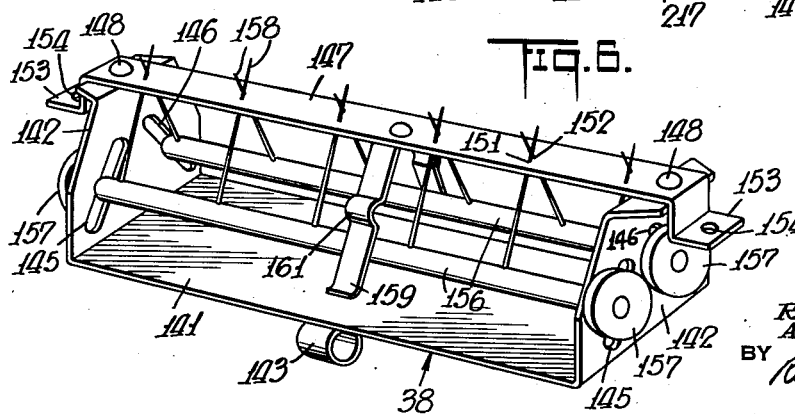
INVENTORS
Robert F. Eddy
Allan F. Eddy
BY
ATTORNEY

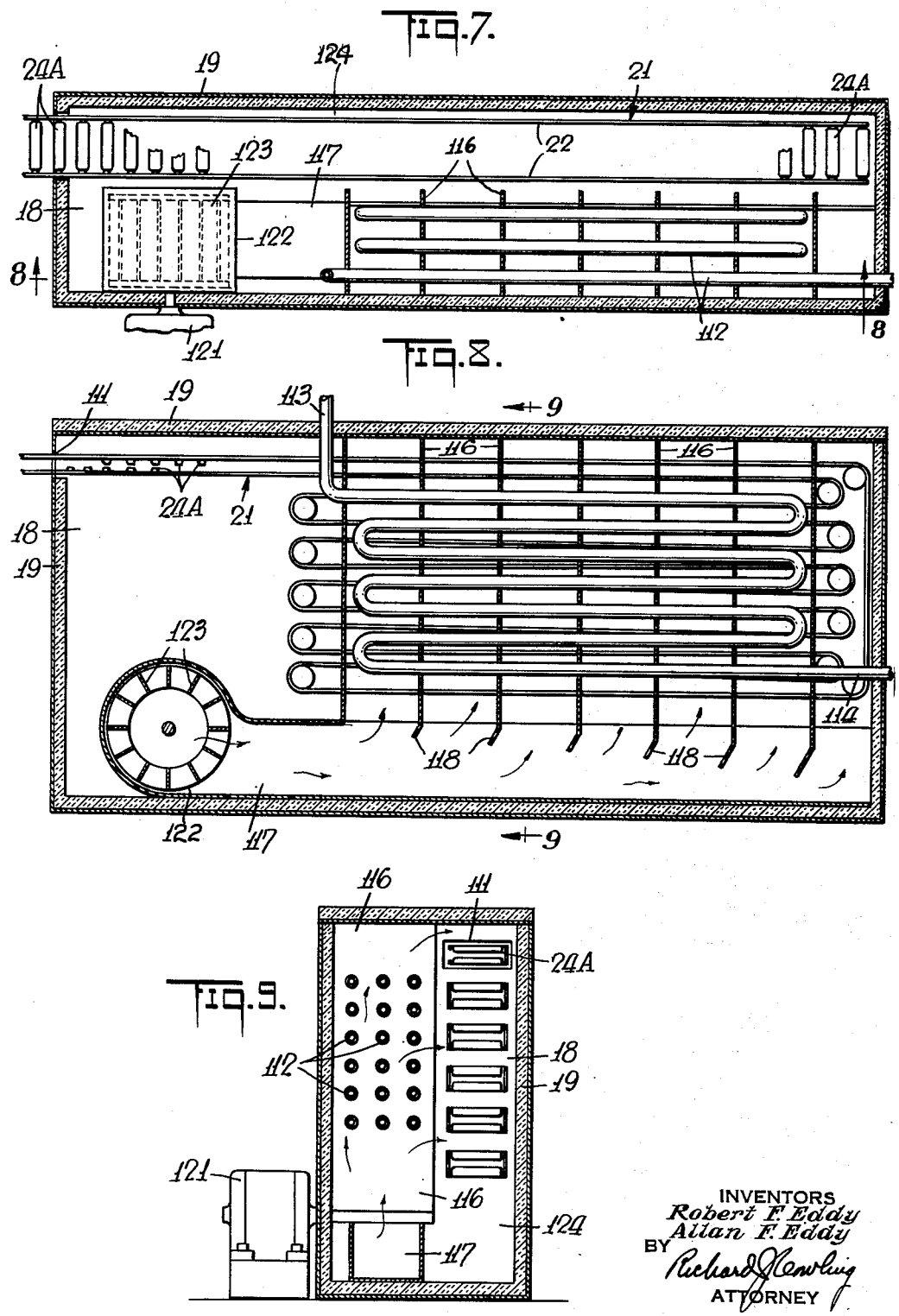

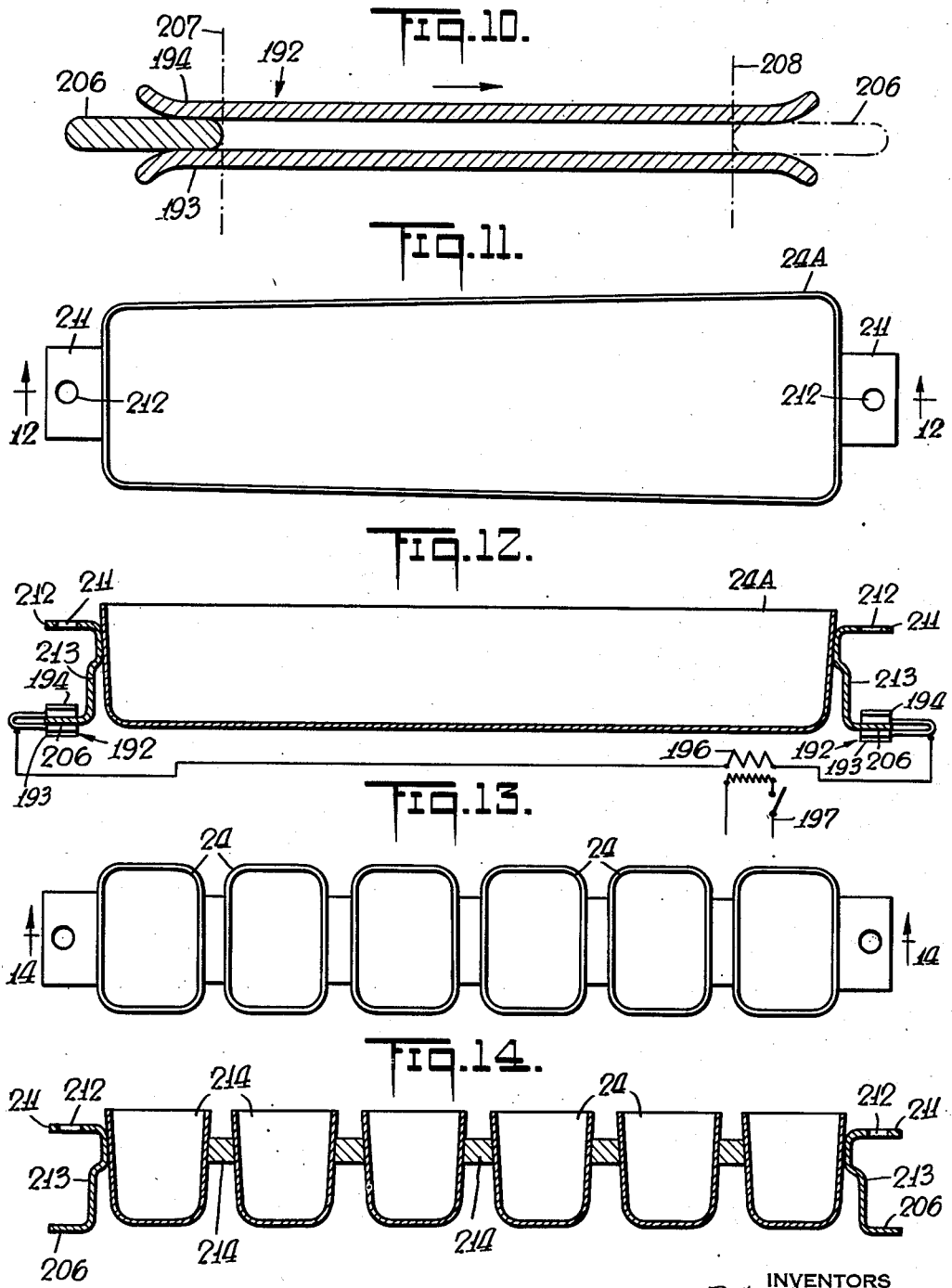

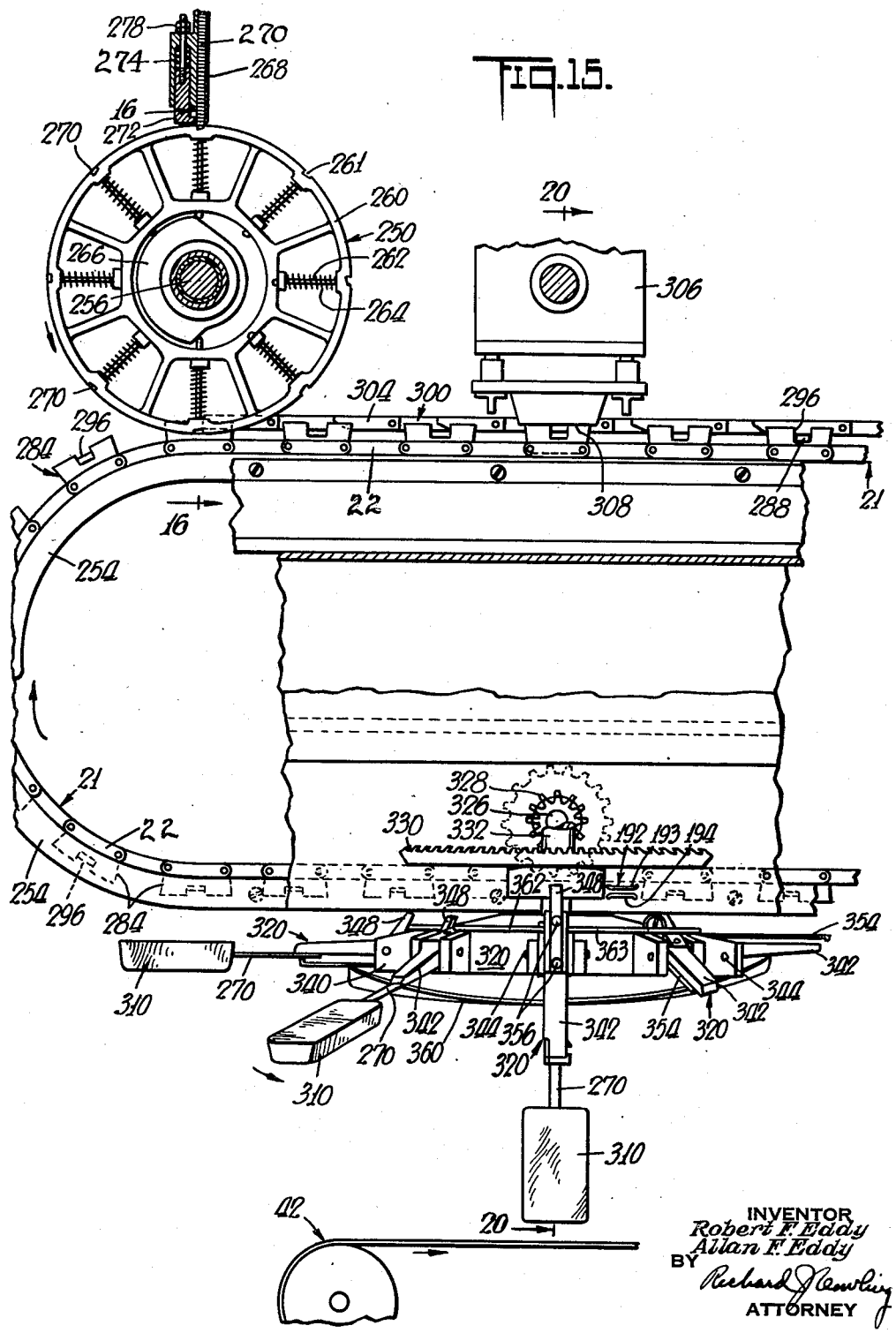

Jan. 13, 1953     R. F. EDDY ET AL     2,625,129
AUTOMATIC FROZEN CONFECTION MAKING APPARATUS
Filed July 1, 1950     9 Sheets-Sheet 7
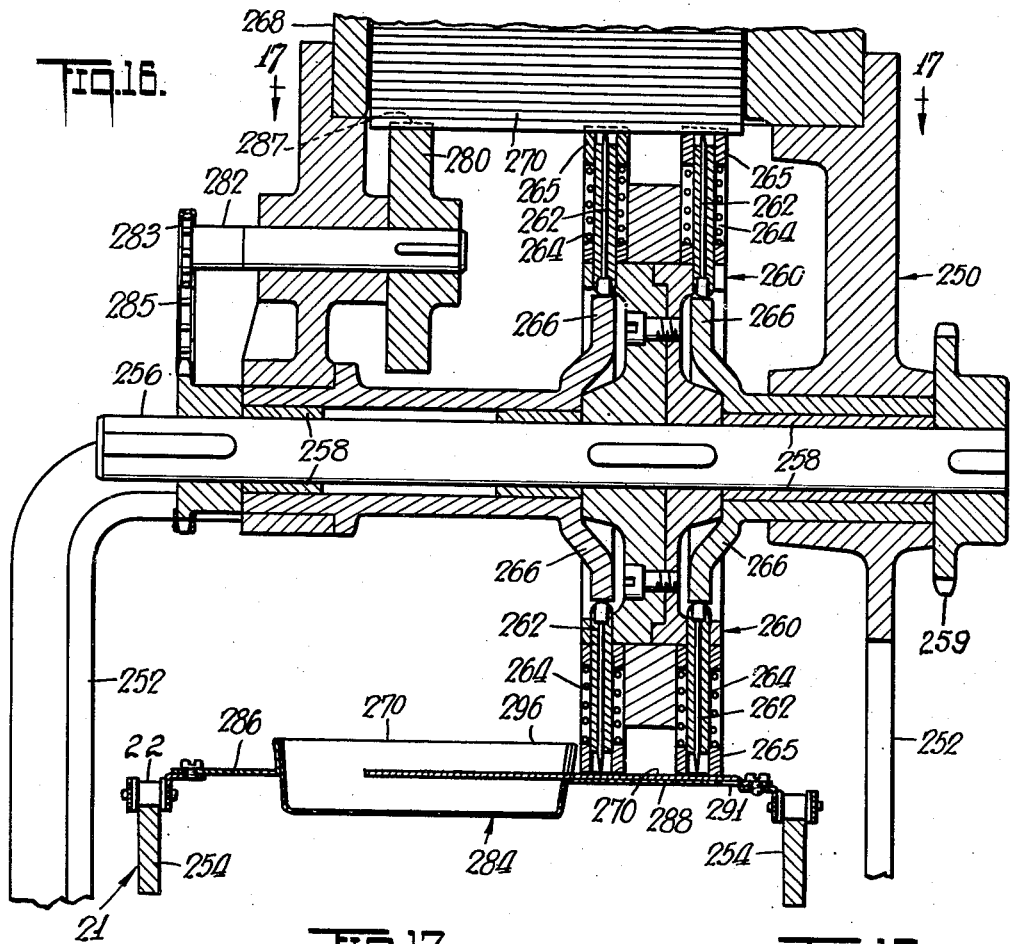
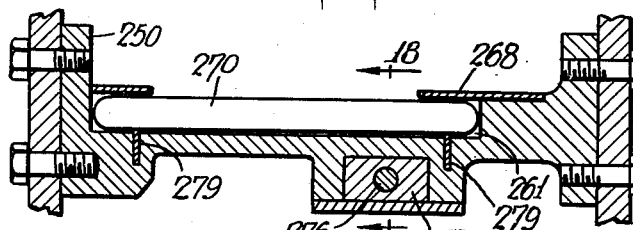
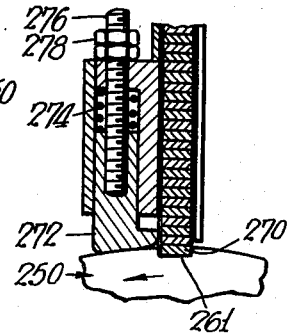
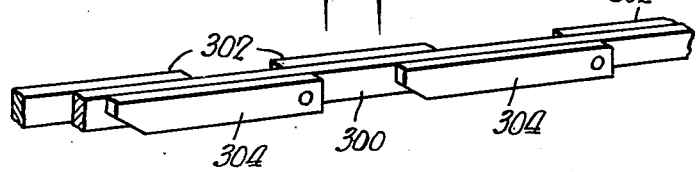
INVENTOR
Robert F. Eddy
Allan F. Eddy
BY
Richard J. Newling
ATTORNEY

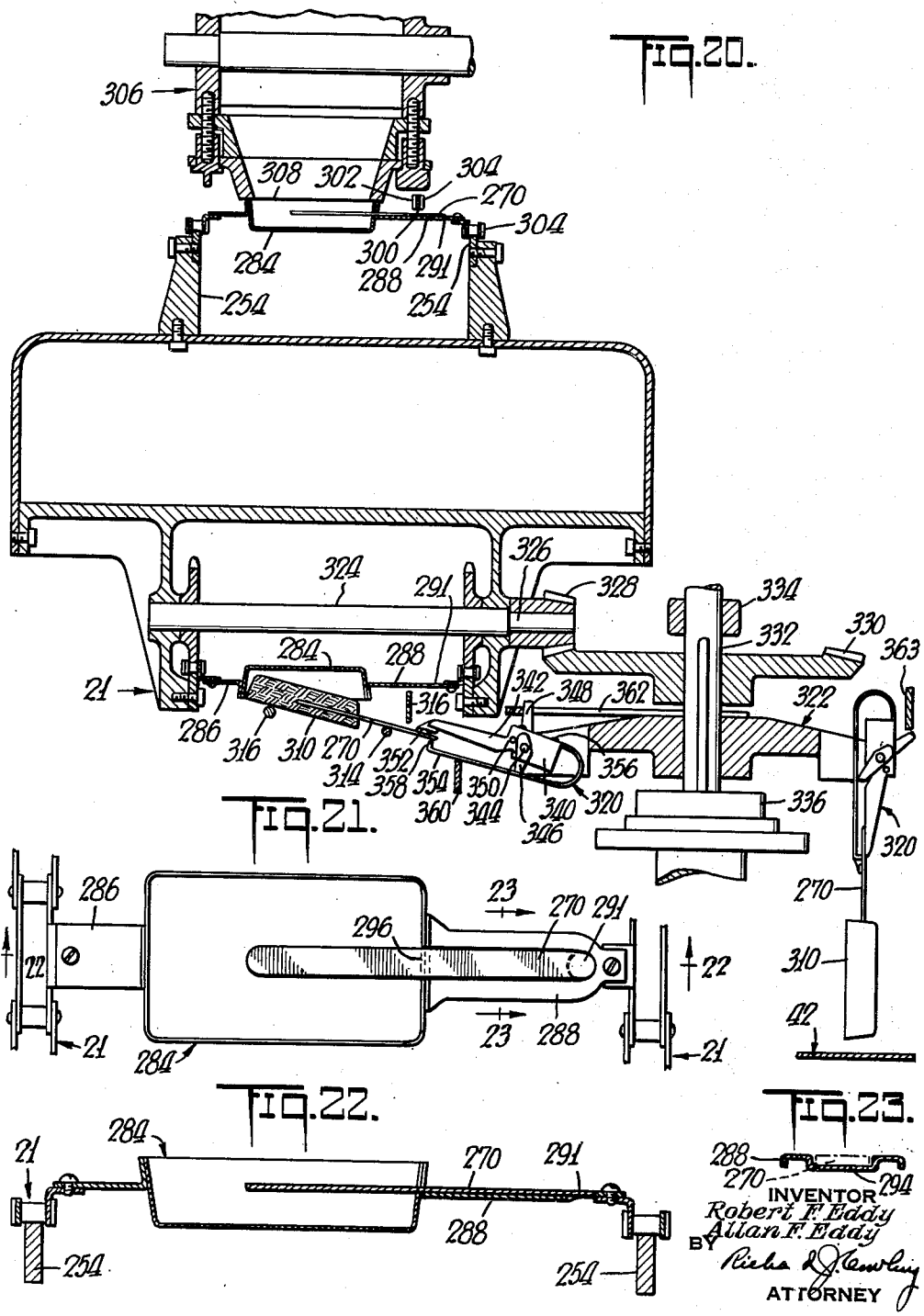

Jan. 13, 1953 R. F. EDDY ET AL 2,625,120
AUTOMATIC FROZEN CONFECTION MAKING APPARATUS
Filed July 1, 1950 9 Sheets-Sheet 9
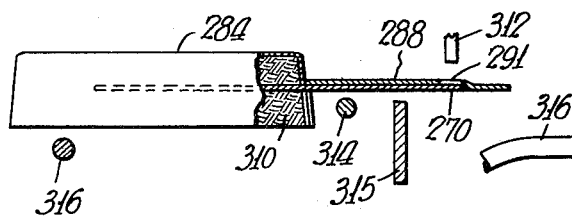
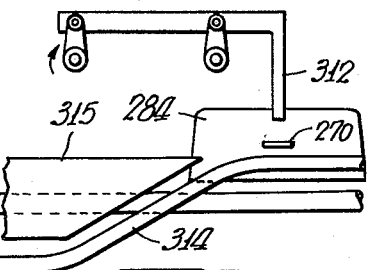
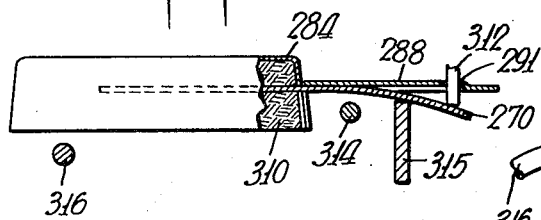
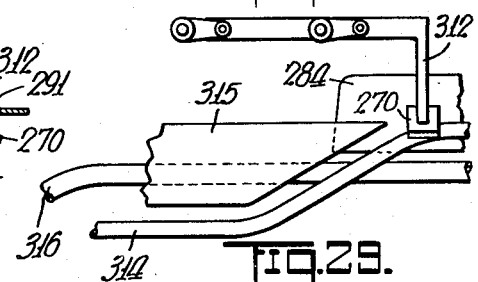
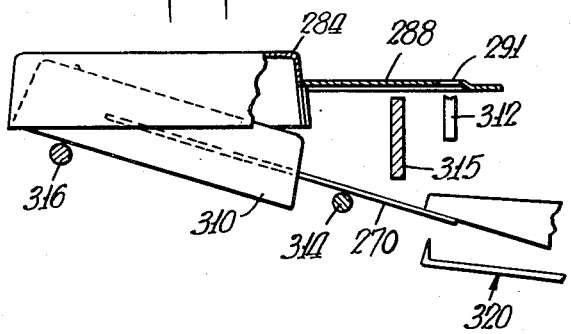
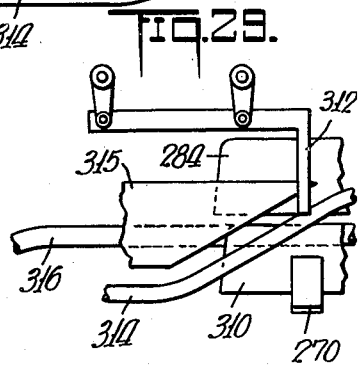
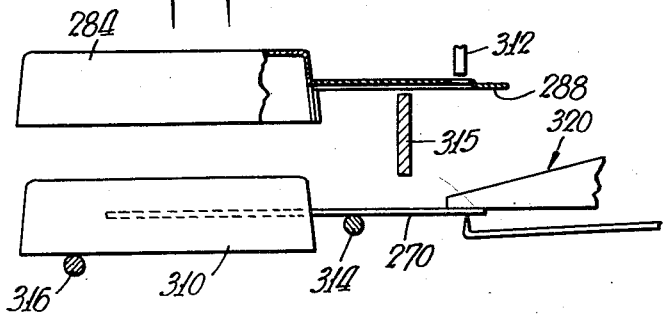
INVENTOR
Robert F. Eddy
Allan E. Eddy
BY
Richard J. Newling
ATTORNEY Patented Jan. 13, 1953

UNITED STATES PATENT OFFICE 2,625,120

AUTOMATIC FROZEN CONFECTION MAKING APPARATUS

Robert F. Eddy and Allan F. Eddy, San Marino, Calif.

Application July 1, 1950, Serial No. 171,618

31 Claims. (Cl. 107—8)

This application is a continuation-in-part of our co-pending application, Serial No. 578,178, filed February 16, 1945, now abandoned, entitled Automatic Frozen Confection Making Apparatus.

The present invention relates generally to the art of forming, refrigerating and harvesting frozen confections, and it has particular relation to a new and improved automatic machine capable of measuring desired quantities of a liquid or semi-liquid material, such as semi-frozen ice cream, sherbet or the like, depositing the same in individual molds, freezing the contents of such molds in a dry circulating air refrigeration chamber, engaging the frozen confection, releasing the frozen confection from its respective mold by electrically heating the mold to melt the freezing bond therebetween, coating the frozen confection by immersion while so engaged, and then releasing said coated confection from its engaging device for bagging or packaging.

Developments in the ice cream industry in the past twenty years have resulted in the production annually of billions of frozen confectionery products which have become one of its largest and most profitable items.

Frozen stick confections are produced generally by carrying out in a laborious manner a series of manual operations. For example, a multi-cavity mold is first filled with a substance to be frozen, a stickholder having a plurality of depending spaced sticks is positioned over said mold with the lower ends of the sticks immersed in the substance to be frozen, the mold is then placed in a refrigerating brine tank through which it is moved from one end to the other manually or mechanically. When the mold contents are frozen, the wet, dripping mold is removed manually from the refrigerating brine of the tank and placed manually into a tank containing hot water for defrosting, the heat of which causes the frozen bond to be melted between the individual confections and their respective mold walls so that they may be withdrawn therefrom by their handle sticks, which are locked releasably in spaced relation in the stickholder. While the confections are thus held by their handle sticks, they are manually immersed in a molten bath of coating material to provide them with a suitable outer coating. The coated confections are then ready to be released from the stickholder for bagging or wrapping. Thus, it will be seen that such operations are slow, laborious and insanitary unless the operators take extreme care in handling the wet, dripping molds when they are taken from the brine and defrosting tanks. Furthermore, such manual operations result in the manufacture of confections which are not uniform in size or shape due to lack of control during the defrosting operation, and which have outer coatings of varying thicknesses due to lack of control during the dipping or coating operation.

Stickless confectionery products of the "bonbon" or "bar" type are either made in a manner similar to that above-described for stick confections, wherein a spur plate device, having spaced depending metal tines, is substituted for the stickholder, or they are cut into small individual pieces from a large slab or block of frozen material, impaled on wires by which they may be immersed manually in a coating material, or spray coated in the same manner as candy confections. Such stickless confectionery products are then ready for wrapping or boxing. These operations are likewise laborious, tedious and insanitary in many respects, and result in the manufacture of many confections which are not uniform in size, shape or thickness of their outer coatings.

It is the purpose of this invention to produce an automatic machine, which will eliminate, to a large degree, the many manual operations presently employed in the production of frozen confections, and which will produce confections of substantially uniform size and shape, provided with a coating of uniform thickness, in a most efficient, economical and highly sanitary manner.

In carrying out the invention, the machine thereof affords an economy in the cost of manufacture of such products, which is material and considerable, and further increases the uniformity of such products as well as raises the standards of sanitation and control far above above any production methods heretofore described.

The machine of the invention involves the empolyment of continuous and intermittently operating devices in association. The invention will be first described in connection with the simultaneous manufacture of a plurality of chocolate coated ice cream bon-bons. Secondly, a modification of the invention will be described as applicable to adaptations of the machine for making stick confections. However, it is to be understood that its use is not so limited and that other types of food products may be frozen therein and thereby if desired without departing from the spirit thereof or from the scope of the appended claims.

The machine consists of an endless continuously moving conveyor, which is adapted to support a plurality of open-top molds suitably spaced and fastened removably thereon. A filling device is mounted over the mold conveyor adjacent one end of the machine and synchronized therewith so as to deposit the desired amounts of unfrozen or semi-frozen material into each of the open-top molds passing thereunder. The conveyor continues to advance the molds and their contents into and through a circulating dry air refrigeration chamber in which they are moved back and forth over a series of different levels for a sufficient length of time to freeze solidly the contents of the molds.

The freezing chamber is cooled by forced currents of air circulated over a series of low-temperature refrigerating coils, and directed by deflecting baffles in continuous streams against the molds in a general direction at right angles to their line of travel. The moving streams of refrigerated air become diffused and agitated as they strike the sidewalls of the molds, passing around on all sides thereof, accomplishing quick freezing of the substances in the molds in a highly sanitary and efficient manner.

By the time the contents of the molds have been frozen solidly, the conveyer is ready to discharge the molds from the refrigeration chamber. The molds with their frozen contents emerge from the refrigeration chamber on a different level adjacent their point of entrance in an inverted position. The molds then advance toward a defrosting mechanism, and at the same time are brought into juxtaposition with a confection engaging, removing and manipulating mechanism operating synchronously with the mold conveyer. As soon as the frozen contents or confections are engaged by the removal and manipulating mechanism, spaced electrical contact shoes carried by each of the advancing molds engage suitable electrodes mounted in juxtaposition along opposite sides of the conveyer, and with such engagement an electric current of low voltage and high amperage, controlled by suitable timing mechanism, is caused to flow through the closed electrical circuit formed by the passing mold, causing its metal body to heat sufficiently to melt the bond formed between the frozen contents and the mold walls, for releasing the confections therefrom.

At the beginning of the defrosting period, the confections are caused to diverge slightly downwardly and away from the upper or mold carrying conveyer, whereby they become separated from their respective molds. Thereupon, the empty molds continue to advance in an inverted position to a washing station, where a spray of hot water or other suitable washing fluid is discharged into the open ends of the inverted molds. The washed molds must still continue to advance in their inverted position a sufficient length of time to permit the washing fluid to drain therefrom, whereupon they have reached the end of the conveyer cycle, are righted and begin another cycle of operation.

The frozen confectionery products, while engaged by the confection removing mechanism, may be advanced thereby and dipped or immersed in a tank containing a suitable supply of molten coating material, such as chocolate, which is maintained through suitable controls at a constant level and temperature, whereby a uniform all-over coating is applied. This outer coating will be uniform in thickness since the temperature of the coating material and the period of immersion are definitely controlled. From the coating station the coated confectionery products are carried by the removing and manipulating mechanism until the coating material has dried or hardened sufficiently to lose its stickiness. By this time the confectionery products have reached the releasing station. Upon reaching the releasing station, the engaging and manipulating mechanism is actuated to release the confections onto a transversely moving belt conveyer for transmission to a wrapping or packaging machine or table (not shown).

From the foregoing it will be readily apparent that the machine of the present invention performs all of the necessary operations in forming, refrigerating and harvesting frozen confections in a uniform and highly sanitary manner, obviating the many messy, insanitary and laborious manual operations of the aforementioned prior art processes.

It will also be apparent from the foregoing brief description of the invention that a plurality of frozen confectionery products, either in the form of bars or handle stick confections, may be formed simultaneously in a continuous and endless procession with a minimum of labor and under exacting conditions in a most efficient, economical and sanitary manner.

An object of the invention is to provide a simple and relatively inexpensive machine capable of making automatically a plurality of frozen stickless confections simultaneously and continuously in a most efficient, economical and sanitary manner.

Another object of the invention is the provision of an automatic machine for making a plurality of frozen confections simultaneously and continuously in any desired size and/or shape, or of a plurality of different shapes simultaneously, merely by mounting suitable molds of a desired size and shape on the main conveyer.

A further object of the invention is the provision of a simple and novel mechanism for releasing the frozen confectionery products from their respective molds with a minimum of heat and resultant damage to the size and shape of the frozen body, whereby the moving mold becomes a part of an electric circuit and its own resistance causes the generation of sufficient heat for melting the freezing bond for releasing the frozen contents therefrom.

Another object of the invention is to provide a simple and efficient means for transferring a plurality of frozen confectionery products from one conveyer to another conveyer while both conveyers continue to move along their own circuitous paths.

A further object of the invention is the provision of simple, efficient and automatic means for releasing the finished confections from their impaled work fingers for delivery to a suitable wrapping, bagging or packaging station.

Another object of the invention is to provide an open-top mold having electrical contact shoes and means for centrally positioning a handle stick therein and maintaining said stick in its desired position during the filling of said mold and until its contents are frozen sufficiently to maintain the position of said stick.

A further object of the invention is the provision of novel means for depositing a single handle stick in its desired position in each moving mold as the same is passed under a stick magazine containing a supply of such sticks.

Another object of the invention is to provide suitable means for engaging said confections by their respective handle sticks as they are being released from their respective molds, whereby they may be manipulated by said sticks and transferred to a conveyer for delivery to a suitable wrapping, bagging or packaging station.

Other and further objects and advantages of the invention reside in the detailed construction of the apparatus, which result in simplicity, economy and efficiency, and which will be apparent from the following description, wherein two forms of embodiment of the invention are shown, reference being had to the accompanying drawings, forming a part hereof, wherein like numerals indicate like parts, in which:

Fig. 1 is a diagrammatic longitudinal sectional view of a machine embodying the principles of the invention, illustrating particularly the arrangement of its several mechanisms and the circuitous paths of its several conveyors;

Fig. 2 is an enlarged fragmentary side elevational view of a portion of the machine diagrammatically shown in Fig. 1, illustrating the details of the driving mechanism and the construction of the conveyors;

Fig. 3 is a fragmentary longitudinal sectional view, on an enlarged scale, of the impaling mechanism used in transferring the frozen bar type products from their molds carried by the main conveyors to the impaling devices carried by the second conveyor, illustrating the series of movements of the operating cam mechanism in the act of impaling the frozen contents of a mold;

Fig. 4 is another fragmentary longitudinal sectional view of the impaling mechanism shown in Fig. 3, illustrating the series of movements in the operation of separating an impaled confection from its respective mold;

Fig. 5 is another fragmentary longitudinal sectional view of the impaling mechanism shown in Figs. 3 and 4, illustrating the series of movements in the operation of releasing a finished coated confectionery product from its impaling fingers onto a belt conveyor;

Fig. 6 is an enlarged perspective view of one of the impaling devices carried by the second conveyor, showing its six sets of impaling fingers, one each of which is adapted to impale the contents of a cavity of a multi-cavity mold of the type shown in Figs. 13 and 14, Fig. 7 is an enlarged top plan view of the refrigeration chamber shown diagrammatically in Fig. 1, illustrating its structural features and arrangement of parts, and showing the main conveyor equipped with single cavity molds of the type shown in Figs. 11 and 12;

Fig. 8 is a longitudinal sectional view of the refrigeration chamber shown in Fig. 7, the same having been taken substantially along the lines 8—8 thereof, looking in the direction of the arrows;

Fig. 9 is a cross-sectional view of the refrigeration chamber shown in Fig. 8, the same having been taken substantially along the lines 9—9 thereof, looking in the direction of the arrows;

Fig. 10 is an enlarged longitudinal sectional view of one of the electrodes shown in Fig. 1, showing a contact shoe of a mold entering one end thereof and at its position at the time the current is turned on, and also showing in dotted lines the position of the same contact shoe at the time the current is turned off as it is leaving the electrode;

Fig. 11 is an enlarged top plan view of one of the single cavity molds shown on the main conveyor in Figs. 7, 8 and 9;

Fig. 12 is a longitudinal sectional view of the single cavity mold shown in Fig. 11, taken along the lines 12—12 thereof, looking in the direction of the arrows, and illustrating the manner in which the mold contact shoes engage the electrodes spaced on opposite sides of the main conveyor;

Fig. 13 is an enlarged top plan view of one of the multi-cavity molds shown attached to the main conveyor in Figs. 1 to 5;

Fig. 14 is a longitudinal section view of the multi-cavity mold shown in Fig. 13, the same having been taken substantially along the line 14—14 thereof, looking in the direction of the arrows;

Fig. 15 is a side view of a modification of the machine shown in Figs. 1 to 14, both inclusive, which modification is adapted to make frozen confectionery products containing handle sticks, wherein a stick feeding attachment has been mounted in front of the filling device and a pick-off conveyor has been substituted for the impaling mechanism for removing the frozen confections from their respective moving molds by their handle sticks;

Fig. 16 is a cross-sectional view taken substantially along the line 16—16 of Fig. 15, looking in the direction of the arrows, showing the stick feeding attachment in greater detail;

Fig. 17 is a cross-sectional view taken substantially along the line 17—17 of Fig. 16, looking in the direction of the arrows, showing another view of the stick magazine;

Fig. 18 is a vertical sectional view taken substantially along the line 18—18 of Fig. 17, looking in the direction of the arrows, showing the manner of controlling the discharge of sticks;

Fig. 19 is a fragmentary perspective view of the stick guiding device shown in Fig. 15, which serves to maintain the individual handle sticks in position in their respective molds during the filling operation and until the contents thereof have congealed sufficiently to maintain said position;

Fig. 20 is a vertical sectional view taken substantially along the line 20—20 of Fig. 15, showing the position of a mold and its handle stick in filling position and also the removal of the frozen stick confection from said mold after being refrigerated;

Fig. 21 is a top plan view of one of the molds used in making stick confections;

Fig. 22 is a longitudinal sectional view of the mold shown in Fig. 21, the same having been taken substantially along the line 22—22 thereof, looking in the direction of the arrows, illustrating the position of the handle stick therein;

Fig. 23 is a transverse sectional view of the mold shown in Fig. 21, the same having been taken substantially along the line 23—23 thereof, looking in the direction of the arrows, illustrating the position of the handle stick in its depressed contact shoe;

Fig. 24 is a diagrammatical view of a mold and contents, illustrating its movement into position for releasing the confection therefrom;

Fig. 25 is a front elevational view of the mold and contents shown in Fig. 24, showing the beginning of the operation of removing the frozen confection from its mold and illustrating diagrammatically the operating mechanism therefor;

Fig. 26 is a diagrammatic view of the mold and contents shown in Fig. 24, illustrating the second step in releasing the frozen confection from its mold;

Fig. 27 is a front elevational view of the mold and contents shown in Fig. 26, showing the second step in the operation of removing the frozen confection from its mold and illustrating diagrammatically the position of the operating mechanism therefor;

Fig. 28 is a diagrammatic view of the mold and contents shown in Fig. 26, showing the third step in releasing the frozen confection from its mold and illustrating the start of the operation of one of the clamping jaws of the pick-off conveyor engaging its handle stick;

Fig. 29 is a front elevational view of the mold and contents shown in Fig. 28, illustrating the third step in the operation of removing the frozen confection from its mold, and illustrating diagrammatically the position of the operating mechanism therefor; and Fig. 30 is a diagrammatic view of the completely removed confection, showing its relation to the mold, and also illustrating diagrammatically the engagement of the confection by its stick handle in one of the clamping jaws of the pick-off conveyor.

The bar type machine

Referring now to the drawings, and particularly to Fig. 1 thereof, there is shown diagrammatically the general arrangement of the various operating mechanisms. The machine consists generally of a casing or housing 16 formed into two separate sections 17 and 18, the latter section being provided with suitable insulation 19 on all sides thereof to provide a refrigeration chamber. The sides of both sections 17 and 18 are removable for ready access to the interior thereof for installing, repairing and/or cleaning the machine.

The main conveyor and refrigeration unit

The endless and continuously operating main conveyor 21 consists of a pair of spaced conveying chains 22 operating over a series of suitably spaced sprocket wheels 23 in the section 17, and adapted to carry a series of removable open-top molds 24 positioned transversely and spaced longitudinally thereof. The open-top molds 24 may be of any desired size and shape, and either of a single cavity or multi-cavity construction. The molds 24 or 24-A should be mounted removably on the conveying chains 22 so as to permit ready changing when products of different sizes and/or shapes are desired.

The main conveyor 21 is mounted on a series of spaced sprocket wheels 23 so as to operate horizontally over the top of the sections 17 and 18 with the open-top molds 24 or 24-A in an upright position for receiving a material to be frozen as they pass under a conventional filling machine 26. After the open-top molds 24 or 24-A are filled, the conveyor 21 advances them into the refrigeration chamber 18.

The main conveyor 21 enters the refrigeration chamber 18 adjacent its top in a horizontal plane with each of its open-top molds 24 or 24-A in an upright position. Within the refrigeration chamber 18, the chains 22 of the main conveyor 21 are trained over a series of spaced sprocket wheels 27 arranged so that the conveyor 21 is operated back and forth over different horizontal levels or planes and eventually emerges therefrom adjacent the point of entrance, but on a lower level, with its open-top molds 24 or 24-A in an inverted position. The molds 24, as they emerge from the refrigeration chamber 18, advance along a horizontal plane back across the section 17 in association with a second endless conveyor 28, which is advancing in a similar direction synchronously therewith. After the contents of the molds 24 have been removed in a manner hereinafter to be described, the inverted molds 24 are carried forwardly by the main conveyor 21 to a suitable washing station, as indicated at 29, where they are washed by means of a suitable jet or spray of hot water flowing from a nozzle 31 mounted on the end of a pipe 32 connected to a suitable source of supply (not shown). A splash plate 33 prevents the water spray from splashing upwardly through the conveyor 21. The used water falls into a funnel-shaped collecting basin 34, and is conveyed away through a suitable waste pipe 36. The washing mechanism, which is only shown diagrammatically in Fig. 1, may consist of a single spray nozzle or a series of transversely spaced spray nozzles, being one for each cavity of a multi-cavity mold. In the arrangement shown, a continuous spray of washing water is projected into the passing molds 24, and obviously the washing spray could be operated intermittently from the driving mechanism in a manner similar to that shown and described in connection with the filling and coating mechanisms, if desired. The details of the washing operation are not of importance, as many various modifications may be used to accomplish the desired result, and therefore they need not be further described herein.

The second conveyor and impaling devices

A second endless and continuously operating conveyor 28 is formed by correspondingly spaced conveying chains 37, having suitable impaling devices 38 mounted thereon. The second conveyor 28 operates in juxtaposition with the main conveyor 21 for a short distance after the latter emerges from the refrigerating chamber 18 until it approaches the electrodes and the frozen contents of the molds have been impaled. The conveyors 21 and 28 then diverge, whereupon the frozen products 39 are separated from their respective molds and carried downwardly by the manipulating fingers of the impaling devices 38 to a coating station where an outer coating is applied, if one is desired, by an immersion process, as hereinafter to be described in detail. The second conveyor 28 advances the coated products 41 from the coating mechanism a short distance until the coating material has hardened or become non-sticky when they are automatically released from the impaling devices 38 upon a third belt type conveyor 42, which carries them away to a suitable wrapping or packaging operation (not shown).

The operating mechanism

The operating mechanism of the several conveyors 21, 28 and 42 is best shown in Fig. 2, and consists of a conventional electric motor 43 suitably mounted, as indicated at 44, on a supporting frame structure consisting of four spaced uprights 46 suitably braced by cross-bars 47. The operation of the electric motor is controlled by means of a conventional starter 48. The motor 43 is directly connected to a conventional reduction gear unit 49, having a drive shaft 51 which, in turn, has a plurality of spaced chain driving sprockets 52 and 53 mounted fixedly thereon. A chain 54 operating over the sprocket wheel 53 drives a sprocket wheel 56 mounted on a shaft 57 journaled between the uprights 46. A pair of suitably spaced sprocket wheels are mounted fixedly on the shaft 57 and provide the driving power for the spaced chains 22 of the main conveyor 21. A third sprocket wheel 58 is also mounted fixedly on the shaft 57, and through a chain 61 drives a sprocket wheel 62 mounted fixedly on a shaft 63 journaled between the upper ends of the uprights 46. A driving gear 64 is also mounted fixedly on the shaft 57, and drives a gear 66 mounted on a shaft 67 journaled between the uprights 46. The shaft 67 has a fixed sprocket wheel 68 for driving a chain 69 connected to a sprocket wheel 71 fixed on a shaft 72 journaled in an adjustable frame structure 73. The shaft 72 has also mounted fixedly thereon a suitably spaced pair of sprocket wheels 74 which drive the spaced conveying chains 76 of the second conveyor 28. The sprocket wheel 52 drives a chain 77 operating over a sprocket wheel 78 which, in turn, is mounted fixedly on a stub shaft 79.

The third or delivery conveyor

A third or belt conveyor 42 operates transversely of the section 17 over suitably spaced pulley wheels 81 fixed to spaced shafts 82 journaled in the frame structure. One shaft 82 has a beveled gear 83 mounted fixedly on its outer projecting end, and operatively engaging a similar beveled gear 84 secured to the upper end of a vertical shaft 86. The shaft 86 is journaled in a bracket 87 secured to the upright 46. The lower end of the shaft 86 is drivingly connected to a horizontal shaft 79 by a similar arrangement of bevel gears (not shown). The particular driving mechanism of the machine need not be further illustrated or described, as varying constructions of driving units may be advantageously employed for operating the several conveying units in a continuous and synchronous manner, without departing from the spirit of the invention.

The filling device

The filling device 26, the details of which are best shown in Fig. 2, is of a conventional construction, and consists of a series of upper compartments 91, each of which is of sufficient size to hold a reasonable amount of liquid or semi-frozen material, such as ice cream or sherbet mixes, to be discharged through the bottom thereof into the open-tops of the molds 24 as they pass therebelow. The bottom of the upper compartment 91 is provided with a corresponding series of passageways 93 leading to a plurality of measuring chambers 94 arranged therebelow. Each of the measuring chambers 94 is provided with a nozzle-like projection 96 adapted to be opened and closed by slide valves operable through a reciprocating bar 97 operable by a connecting rod 98 pivotally connected, as indicated at 100, to an L-shaped lever 99, having the end of its short arm 101 mounted pivotally, as indicated at 102, to one of the uprights 46. The arm 99 has a stub shaft 103 mounted adjacent its upper end and provided with a freely mounted roller 104 for engaging an eccentric cam wheel 106 fixedly mounted on the shaft 63. A spring tension member 107 is mounted intermediate the ends of the arm 99, having its other end secured to a supporting bracket 108 secured to one of the uprights 46. The normal tension of the spring 107 tends to keep the lever 99 in position so that its roller 104 will be brought into contact with the cam wheel 106. The bracket 108 supports a set screw adjustment 109, which varies the tension on the spring 107, causing indirectly a varying in the volume of material to be discharged into the molds within certain limits. The action of this mechanism is such that, if the cam roller 104 dwells against the cam wheel 106 for its full revolution, the largest amount of filling material will be discharged into the molds, but if it is in contact with the cam for only a portion of its revolution a proportionately diminishing amount of material will be discharged into the molds. It is the control of the amount of lost motion in this operating mechanism which controls the length of stroke of the lever 99 of the filling mechanism, and hence the amount of material discharged therefrom.

The number of nozzle-like projections 96 must obviously correspond to the number of cavities in the multi-cavity molds carried by the conveyor 21, and, of course, must be spaced to correspond to the number of the multi-cavity molds used. Manifestly, if a single cavity mold were to be used, its contents must be equivalent to the combined contents of the multi-cavity molds so that the combined discharges from the nozzles 96 will provide the proper amount of material for filling the same. However, means could be provided for closing off one or more of the nozzles 96, if necessary. The construction and operation of the filling mechanism need not be further illustrated or described, as varying types of conventional filling devices may be employed, which may be operated in many different ways, without departing from the spirit of the invention.

The open-top molds 24 of the main conveyor 21 are thus filled automatically as they pass under the filling mechanism 26, and are then carried or advanced in a continuous manner into the refrigeration chamber 18 through an opening 111 in an upright and horizontal position, as best shown in Fig. 8. The molds 24 or 24-A advance in this manner the entire length of the chamber 18, during which period of advancement the surface of their contents becomes frozen sufficiently to prevent the unfrozen contents from spilling therefrom when the molds are tipped or inverted during the remainder of their passage through the chamber 18. The molds 24 or 24-A are carried by the conveyor 21 downwardly to the lowermost level, and then are moved back and forth over different horizontal levels until they emerge in a horizontal plane from the refrigeration chamber 18 through the same opening 111 through which they entered, but on a lower level and in an inverted position.

The refrigeration chamber

The refrigeration chamber 18 has the main conveyor 21 operating longitudinally thereof along one side, as best shown in Figs. 7 and 9. A series of refrigerating coils or pipes 112 are mounted along the opposite side of the chamber 18 in parallel relation to the conveyor 21, and are connected through the pipes 113 and 114 with suitable refrigeration machinery (not shown). The side of the chamber 18 carrying the refrigerating coils 112 is provided with a series of transversely extending vertical baffle plates 116 spaced longitudinally thereof, which serve to provide suitable supporting means for the refrigerating coils 112. An air duct or chute 117 is provided along the bottom of the chamber 18 under the refrigerating coils 112. Integral flanges 118 formed on the lower ends of the vertical baffles 116 project into the air duct 117 varying distances to provide deflecting scoops or baffles 118 for collecting and directing proportionate portions of the circulating air stream passing therealong into the several subdivisions thus created thereby. A conventional electric motor 121 connected directly to a conventional blower fan 122, having a series of spaced radial blades 123, serves to circulate the air within the refrigeration chamber 18. The circulated air upon leaving the fan 122 is blown into the duct 117, and directed by means of the deflecting scoops 118 and vertical baffles 119 across the refrigeration coils 112 in each subdivision thereof. Upon passing over the refrigeration coils 112, the air streams move directly against the continuously moving molds at substantially right angles to their direction of travel. In this arrangement, the moving streams of refrigerated air become diffused and agitated as they strike the sidewalls of the molds, passing around on all sides thereof. After the moving air streams pass through the conveyor 21 and around its molds, they strike against the opposite sidewall of the refrigeration chamber 18 and pass downwardly under the conveyor mechanism, returning through the air duct 124 to the intake side of the fan 122. With extremely low temperature refrigerants circulating through the coils 112, a freezing of the contents of the molds is accomplished quickly in a very efficient and highly sanitary manner.

Referring again to Figs. 1 and 2, the second conveyor 28 is mounted over a series of sprocket wheels 126 mounted on a spaced pair of suitable triangular frame structures 73, consisting of a horizontal bar 127, a vertical bar 128 and an obliquely extending bar 129, the frame structures 73 being mounted between uprights 46 (see Fig. 2). It will be noted that the opposite ends of the horizontal bars 127 of the frame structure 73 are provided with suitable gear racks 131, and that the uprights 46 are each provided with pinion gears 132 mounted for operatively engaging said gear racks 131. The pinion gears 132 are provided with operating handles (not shown) for rotating the same whereby the bar 127 and its conveyor 28 are adjustable with respect to the main conveyor 21 so that its impaling devices 38 may be moved into proper operating position with the molds 24 or 24-A thereof. The vertical bars 128 of the frame structure 73 are made up of two sections 133 and 134, one of which is provided with a pinion gear 136 and the other is provided with a gear rack 137. The pinion gears 136 are each provided with an operating handle (not shown) for operating the same to effect proper tension on the chains 76 of the second conveyor 28.

*The impaling devices*

The details of one of the impaling devices 38 carried by the second conveyor 28 are best shown in Fig. 6, and consists of a U-shaped plate 141 provided with upwardly extending end arms 142. A looped spring cam shoe 143, as best shown in Figs. 3 and 4, is mounted on the underside of the plate 141 adjacent its forward edge. Each of the upwardly projecting end arms 142 is provided with spaced converging and obliquely extending slots 145 and 146. The slots 145 and 146 in one end arm 142 are in alignment with the corresponding slots in the opposite end arm. A cross-bar 147 is mounted by rivets 148 across the upper ends of the upwardly extending arms 142, and is provided with a series of spaced pairs of spaced apertures 151 and 152, the spacing of each pair of apertures corresponding to the spacing of the individual cavities of the multi-cavity molds 24. The outer ends of the cross-bar 147 have downwardly and outwardly projecting offset flanges 153, each provided with a central aperture 154 for attachment to the conveying chains 76 of the conveyor 28 in any suitable manner, as by bolts 155 (see Fig. 4). A rod 156 is mounted between each pair of aligned slots 145 and 146, having cam wheels 157 fixedly secured to the outer ends thereof. Each rod 156 is provided with a series of fixed needle-like spaced impaling fingers 158, projecting upwardly through the openings 151 and 152 in the top cross-bar 147. The impaling fingers 158 on each rod 156 are spaced longitudinally thereof to correspond to the spacing of the openings 151 and 152 through which they are to be operatively projected in the cross-bar 147. Thus, it will be seen that the fingers 158 substantially cross each other in passing through the bar 147 and then diverge beyond their point of crossing. A spring latch member 159 projects downwardly from opposite sides of the top cross-bar 147, and each latch member 159 has a semi-circular indentation or offset, as indicated at 161, intermediate its ends to provide suitable means for locking the rods 156 in a raised position, as best shown in the left hand view of Fig. 3, whereby the impaling fingers 158 project their greatest distance through the cross-bar 147.

*The coating mechanism*

A coating mechanism, indicated generally at 163, is associated with the second conveyor 28 adjacent its lowermost point of travel, and comprises a main or outer tank structure 164 mounted on suitable casters 165 for facilitating removal when desired. The main tank structure 164 is adapted to hold water 166, which is provided with a suitable conventional thermostatically controlled electric heater, as indicated at 167, to maintain the water 166 in the tank 164 at a constant temperature. Within the main tank structure 164 there is provided along one sidewall thereof a separate inner tank structure 171 adapted to receive and hold a quantity of coating material 172. The inner tank 171 has a hinged door 173 opening through the sidewall of the outer tank 164, which provides means for supplying additional coating material to the inner tank 171. Within the inner tank 171 there is mounted a conventional pumping mechanism consisting of a tubular casing 176, having a piston 175 operating reciprocably therein. The piston 175 is connected to a piston rod 178 projecting upwardly and outwardly of the tank 171, which in turn is connected pivotally, as indicated at 179, to a lever 181 fulcrumed intermediate its ends to one of the uprights 46, as indicated at 182. The opposite end of the fulcrumed lever 181 is connected, as indicated at 183, to a lever 184, which, in turn, is connected, as indicated at 186, to an eccentric wheel cam 187 mounted on the shaft 63. The upper end of the tubular casing 176 is provided with a telescopically fitted collar 177, which permits slidable adjustment with respect to the casing 176 to control the height of the liquid coating material in the upper reservoirs. A small receiving reservoir 188 is mounted around the upper end of the collar 177, and is in open communication with a dipping reservoir 191 extending across the top of the main outer tank 164. Thus, it will be apparent that as the pump operates a quantity of heated coating material 172 will be drawn upwardly of the casing 175 into the reservoir 188 from which it may flow into the dipping reservoir 191. Further details of the construction and operation of the coating mechanism need not be shown or described, as varying types of conventional coating equipment may be employed, which would maintain a constant supply of liquid coating material 172 in many different ways, without departing from the spirit of the invention.

The electric defrosting device

Electrodes 192 are shown mounted on opposite sides of the main conveyor 21, and are of a bifurcated construction having spaced contact blades 193 and 194 adapted to receive and engage the contact shoes of a mold passing thereby. (See Fig. 12.) These electrodes 192 are connected, as indicated diagrammatically at 196 in Fig. 12, to an outside source of electric energy 197, and are so wired that a complete electric circuit is not formed until the space between the electrodes 192 on opposite sides of the main conveyor 21 is bridged by one of the passing molds 24 or 24-A. The current to the electrodes 192 is controlled by means of a conventional mercury switch 198 (see Fig. 2), which in turn actuates a conventional magnetic switch (not shown) controlling the current to a conventional transformer (not shown) which is directly connected through suitable wiring (not shown) to the electrodes 192. The mercury switch 198 is actuated by means of a lever 199, which is connected pivotally, as indicated at 201, to a reciprocating lever 202. The reciprocating lever 202 is connected at its opposite end eccentrically, as indicated at 203, to a wheel cam 204 mounted fixedly on the shaft 63. Thus, it will be apparent that the energization of the electric circuit leading to the electrodes 192 will be timed to correspond to the movement of the mold contact shoes between its contact blades 193 and 194. The various parts of the timing mechanism are all of conventional constructions, and, as the accomplished result may be obtained in a varied number of ways by anyone skilled in the electrical art, it is not believed essential to describe or illustrate its details further in this specification.

There is shown in Fig. 10 an enlarged diagrammatical view of one of the bifurcated electrodes 192 to be mounted on opposite sides of the main conveyor 21 in a position to slidably receive the spaced contact shoes of the molds passing thereby. In this view the position of one of the mold contact shoes 206 is shown entering on the left between the spaced blades 193 and 194 of the electrode 192, and the dotted vertical line 207 indicates the position of the mold contact shoe 206 at the time the electric circuit of which the mold 24 or 24-A becomes a part is energized. The arrow indicates the direction of travel of the contact shoe 206 between the blades 193 and 194. In the dotted line position shown at the right of the figure, the mold contact shoe 206 is shown leaving the spaced blades 193 and 194 of the electrode 192, and the dotted vertical line 208 indicates the position of the shoe 206 at the time the electric current is turned off. It has been found advisable to regulate the electric circuit so that the current is not turned on until after the mold contact shoes 206 have entered and made contact with the blades 193 and 194, and to turn off the current before the mold contact shoes 206 leave the blades 193 and 194 in order to prevent unnecessary arcing or sparking since high amperage current is used in the defrosting operation. The defrosting operation may be operated with different kinds of current and at different voltages, etc. We have found that a 3 kva. unit, using A. C. current, having a primary voltage of 220 and a secondary voltage of 1½ operates satisfactorily.

The bar type molds

There is shown in Fig. 11 a single cavity mold 24-A of the type mounted on the conveyor 21 in Figs. 7 to 9, which is constructed of suitable non-corrosive, acid and rust resisting metal, such as stainless steel, having outwardly projecting lugs 211, each provided with apertures 212 for receiving suitable means, such as a bolt, for attachment to the conveyor chain 21 in any removable manner (not shown). In view of the low voltage required for the defrosting operation, it has been found unnecessary to insulate the mold structure 24 or 24-A from the conveyor chains 22, but suitable insulation in the form of a fibre washer or gasket may be employed, if desired. The lug 211 has a downwardly extending integrally formed offset flange 213, as best shown in Fig. 12, provided with a horizontally projecting contact shoe 206 for engaging the electrodes 192.

In Figs. 13 and 14 there is shown a multi-cavity mold 24, which has the same outer dimensions as the single cavity mold 24-A shown in Figs. 11 and 12, and which may be used interchangeably or simultaneously therewith on the main conveyor 21. The multi-cavity mold 24 is provided with the same outwardly projecting lugs 211, having apertures 212 and contact shoes 206. A connecter or spacer bar 214 is mounted between each of the individual cavities of the multi-cavity mold 24. While the molds 24 and 24-A may be constructed of stainless steel or other suitable metals having a high resistance to electricity, it has been found advisable to make the contact shoes 206 and the connecters 214 of any suitable low resistance material, such as copper.

The operation of the bar type machine

In describing the operation of the machine, it will be assumed that the several conveyors are running and that the various operating units are functioning in the manner described. The molds 24 or 24-A are advanced under the filling mechanism 26 and are filled with a suitable material to be frozen. This operation is performed so quickly that the individual mold cavities can be filled with the desired charges of material from the filling nozzles 96 without interrupting the continuous movement of the conveyor 21. The molds are then carried by the main conveyor 21 into the refrigerating chamber 18 in an upright position, and by the time they have advanced across the top thereof to the opposite end their contents have solidified sufficiently to prevent spilling out as the molds are turned sidewise and carried downwardly to the lowermost level, whereupon they become inverted and are carried in that position along the bottom level. The molds are carried back and forth over the different horizontal levels until they are carried back to the point of their entrance, whereupon they emerge from the refrigeration chamber 18 with their contents 39 solidly frozen. It will be noted that the molds emerge from the refrigerating chamber 18 on a different and lower level than that on which they entered, but in an inverted position (see Figs. 1 and 2).

As the molds emerge from the refrigeration chamber 18 in an inverted position, they are brought into juxtaposition with the impaling devices 38 of the second conveyor 28. The two conveyors 21 and 28 advance in a synchronous manner with their respective molds 24 and impaling devices 38 suitably and vertically aligned. As the conveyors 21 and 28 advance in this manner, the cam wheels 157 of the impaling devices 38 contact and ride up an inclining cam plate 217 (see Figs. 2 and 3), causing the rods 156 to be pushed upwardly carrying the impaling fingers 158 upwardly and causing them to project through the top cross-bar 147 into injectment position into the frozen mold contents 39, as best shown in detail in Fig. 3. The impaling fingers 158 are locked in their projected position by the spring latch 159, whose indenture 161 engages the rod 156. Once the impaling fingers 158 are projected into the frozen products 39, they will remain thereon without difficulty for future manipulation over an indefinite period of time.

As soon as the impaling fingers 158 have been injected into the frozen mold contents 39, the electric contact shoes 206 of the molds enter between the blades 193 and 194 of the electrodes 192, thereby causing the mold structure to complete the electric circuit and become an integral part thereof. The circuit is now ready to be energized by the mercury switch 198, which operates in relation to the position of the mold. The current passing through the mold circuit causes the metal body of the mold to become heated sufficiently to melt the ice bond formed between its frozen contents 39 and the inner surfaces of the mold walls during the freezing operation, thereby freeing the contents therefrom. The operating mechanism of the mercury switch 198 is timed by mechanical means to cut-off the electric current in the circuit before the mold contact shoes 206 leave the blades 193 and 194 of the electrodes 192. The main conveyor 21 continues to advance the molds along a horizontal plane, but the second conveyor 28 diverges away from the main conveyor 21, causing separation of the frozen products 39 from their respective mold cavities, as best shown in Figs. 2 and 4. It will be noted that, as the conveyors 21 and 28 diverge, the looped spring cam shoe 143 of the impaling device 38 rides down a declining cam plate 218 (see Fig. 4), which prevents the impaled confection 39 from striking the mold during the separation operation. The inverted advancing molds on the main conveyor 21, as it separates from the second conveyor 28, enter a washing station where they are washed with a suitable spray of water (see Fig. 1). After the washing operation the molds continue to advance a short distance in an inverted position to permit all of the washing water to drain therefrom, whereupon the molds are ready to be righted with their open-tops positioned for receiving the filling material as they again pass under the filling mechanism for beginning another cycle of operation.

The second conveyor 28 advances the impaling devices 38 downwardly toward the coating mechanism 163. The coating mechanism must be spaced from the defrosting operation sufficiently to allow sufficient time to elapse to permit the wet and melting surfaces of the frozen products 39 to refreeze or dry. If the surfaces of the frozen products 39 are wet when they reach the coating station, it will be impossible to give them a satisfactory coating. The second conveyor 28 carries the impaled products 39 through the molten bath of coating material 172 in the reservoir 191, whereby the frozen products 39 are immersed in the coating material a predetermined length of time to receive a coating of the desired thickness. The conveyor 28 continues to advance the impaled coated confections 41 toward a releasing mechanism, which also must be positioned a sufficient distance from the coating station to permit a thorough hardening of the coating material before they are released from their impaling fingers. By the time the inverted impaling devices 38 have reached the inclined cam releasing plate 219, which is shown in detail in Fig. 5, the coating material is hard and no longer sticky or messy. As the inverted impaling device 38 is moved over the inclined releasing cam plate 219, it engages the cam rollers 157 and moves them upwardly, forcing the rods 156 out of the locking notch 161 of the spring latch 159, withdrawing the fingers inwardly through the top plate 147, which serves to strip the coated products 41 therefrom.

The released products 41 fall from the impaling fingers 158 onto a belt conveyor 42, which is mounted below the releasing cam plate 219. The belt conveyor 42 conveys the finished confectionery products to a suitable sorting, wrapping or packaging table (not shown).

The stick type machine

Referring now to Figs. 15 to 30, both inclusive, there is shown a modification of the bar type of machine depicted in Figs. 1 to 14. In this modification, an uncoated confection is being made. The main conveyor 21 is equipped with an entirely different type of mold. The type of mold for making stick confections is shown in Figs. 21 to 23, both inclusive. A stick depositing device 250 is mounted over the conveyor 21 in front of the filling device 306, and is adapted to deliver and position a wooden handle stick in each of the stick pockets of the molds passing thereunder. Obviously, more than one stick may be deposited in each mold, if desired.

In place of the diverging second conveyor 28 of the bar type machine, which carries a series of impaling devices 38, the modified machine for making stick confections is provided with an endless second conveyor equipped with suitable pick-off devices, which are adapted to grasp the projecting ends of the handle sticks of the confections, and to transfer said confections to a third conveyor 42 for delivery to the bagging or packaging operation. It is to be understood, however, that the stick machine need not be restricted to an uncoated confection, but can be used to manufacture coated confections by merely increasing the size or length of the second conveyor operating as a transfer mechanism, whereby the confectionery products can be carried through a coating operation similar to that described in connection with the bar type machine before being released upon the delivery conveyor 42.

The stick depositor

Referring now to the drawings comprising Figs. 15 to 30, both inclusive, and particularly to Figs. 15 to 18 thereof, there is shown a stick depositor 250, which is provided with spaced supports 252 for mounting the same in a straddling position over the main conveyor 21, operating over side rail supports 254. The supports 252 have a shaft 256 mounted therebetween journaled in conventional bearings 258. The shaft 256 is driven through its keyed sprocket wheel 259 by a chain (not shown) connected with the driving mechanism of the conveyor 21. A separable or split turret wheel 260 is keyed to the shaft 256, and is provided with a series of depressed stick receiving slots 261, each slot is provided with a pair of circumferentially spaced impaling pins 262. Each of the pins 262 is provided with a retracting spring 264, which is mounted within the pin housing 265 and tends to withdraw the pins radially inwardly thereof. A circular cam 266 provides a cam track for operating the impaling pins 262, as will hereinafter be more fully explained. Mounted above the turret wheel 260 is a stick magazine 268, adapted to receive and support a plurality of conventional flat confectionery handle sticks 270 in a vertically stacked position. The handle sticks 270 may be purchased in a banded stacked position or may be suitably stacked by other conventional apparatus (not shown) before being fed or placed in the magazine 268. An adjustable stop or shoe 272 is mounted adjacent the forward discharging end of the magazine 268, as best shown in Fig. 18. The shoe 272 is spring pressed by the spring 274, and is capable of longitudinal adjustment by means of the bolt 276 and nuts 278. With this adjustment, the shoe or stop 272 may be maintained adjacent to but not in actual contact with the outer surface of the turret wheel 260, and serves to prevent more than one handle stick 270 at a time being deposited in the receiving slot 261 thereof. It will be noted in Fig. 17 that the one side of the stick magazine 268 is substantially open to permit manual flexing of any warped or turned sticks that may become lodged therein. The closed side of the magazine 268 is provided with spaced guide rails 279, which engage the edges of the sticks 270 and serve to reduce frictional contact within said magazine. The open side of the magazine is provided with a guide wheel 280 mounted fixedly on a shaft 282, which is in turn driven by a sprocket wheel 283 through a chain 285. The guide wheel 280 has a series of circumferentially spaced slots 287, which correspond with the slots 261 of the turret wheel 260. The peripheral speed of the guide wheel 280 corresponds to the peripheral speed of the turret wheel 260. The slots 287 serve to receive the free end of the stick 270 while its other end is positioned in the slot 261. In this way both ends of the stick are held simultaneously so that the stick 270 cannot be twisted in the feeding operation. Due to the much smaller diameter of the guide wheel 280, its contact with the stick 270 is of a short duration and serves only to assist in moving the outer or free end of the stick 270 away from the feeding magazine and to help carry it through the spring pressed stop 272.

In the operation of the stick depositor 250, it will be assumed the same is operating continuously in synchronism with the mold conveyor 21 running therebelow so that each stick receiving slot 261 becomes aligned and substantially superimposed over the stick receiving slot of the confection mold hereinafter to be explained. As the receiving slot is moved away from the mold after depositing its stick, the pins 262 are retracted by their respective springs 264 into a non-impaling position within their respective housings 265. As the empty slot 261 with its withdrawn pins 262 approach the stick magazine 268 and become substantially aligned with the lowermost stick therein, the stick gravitates into the empty receiving slot 261 and is carried under the stop 272. The cam plate 266 now engages the enlarged base of the pins 262, as best shown in Fig. 16, and forces them upwardly by camming action until their pointed ends impale said stick 270 adjacent one end. The spring pressed stop or shoe 272 serves to maintain said stick in position in the slot 261 against the impaling force. The circular cam 266 holds the impaling pins 262 outwardly and in impaling position until the stick 270 is to be deposited in its mold 284, as best shown in Fig. 15, whereupon the cam track drops away and permits the springs 264 to withdraw the pins 262 from said stick and into their respective housings 265, the latter serving to maintain the stick 270 in position in the mold during the pin withdrawing action.

The stick confection mold

The stick confection mold 284, which is best shown in Figs. 21 to 23, is constructed along the lines of the bar type mold 24-A of Fig. 11, and is adapted to be secured to the chain 22 of the main conveyor 21 in an identical manner. The mold 284 is provided with spaced electric contact shoes 286 and 288, which are adapted to pass between the electrodes of the defrosting mechanism 192. The contact shoe 286 is identical in construction with the contact shoes 211 of the bar mold 24-A, but the contact shoe 288 is of a different construction since provision must be made for receiving the handle stick. The contact shoe 288 is longer than the projecting end of the handle stick 270 of the confection 310, and is provided with a depression 294 substantially of the size and shape of the projecting end of said handle stick 270, as best shown in Fig. 23. The contact shoe 288 is also provided with an aperture 291 adjacent its outer end, which facilitates removal of the confection, as will be hereinafter described. The end of the mold 284 from which the contact shoe 288 projects is, of course, slotted, as indicated at 296, to permit the handle stick 270 to pass therethrough. The handle stick 270, when positioned properly in its mold 284, assumes the position substantially as shown in Figs. 21 and 22 at the time the mold passes under the filling device.

There is shown in Fig. 15 an elongated rack or bar 300 extending from the stick depositing mechanism into the refrigeration chamber, which has a plurality of pivotally mounted rod segments 302 and 304 mounted on opposite sides thereof. A detailed view of the rack or bar 300 is shown in Fig. 19. The pivoted rod segments 302 and 304 serve to ride over the projecting end of the handle stick 270, flexing it periodically to prevent air spaces forming directly below the handle stick extending into the contents of the mold 284, and also to assure that, when the confection material has settled, the handle stick 270 will be centrally positioned therein. It is not necessary to provide closure means for the small slot 296 above the handle stick 270 in the mold 284, because the confection material is semi-frozen in a conventional ice cream freezer (not shown) before being placed in the filling mechanism, and, as a consequence, has no tendency to flow out of the mold slot 296. However, if desired, a closure member may be provided therefor.

The filling mechanism

There is shown in Fig. 15 a diagrammatic view of a conventional filling mechanism 306, which corresponds with the filling mechanism 26 of the bar type machine, except that it has a single depositing nozzle 308 since only one mold cavity is being filled at a time. This filling mechanism 306 is operated off the conveyor driving mechanism substantially as previously described for the filler mechanism 26 of the bar type machine. The construction and operation of the filling mechanism need not be further illustrated or described, as varying types of conventional filling devices may be employed, which may operate in many different ways, without departing from the spirit of this invention.

*The confection removing apparatus*

Referring now to Figs. 15, 20 and 24 to 30, there is shown and illustrated the removal of the finished confections 310 from their respective molds and their delivery onto the conveyor 42 for wrapping or packaging.

The molds 284 after leaving the refrigeration chamber 18 pass between the electrodes 193 and 194, and are given an electrical charge in the manner previously described in connection with the bar type machine, thereby causing their release from the sides of said molds by melting the freezing bond formed therebetween.

Immediately after the mold 284 emerges from the electrical defrosting mechanism 192, the projecting end of the handle stick 270 is contacted by a pitman rod 312, which operates as a depressing finger through the aperture 291 to force the end of the handle stick 270 away from the contact shoe 288. A guide rail 314 is positioned below the contact shoe 288, and serves as a support for the handle stick. A second guide rail 316 is positioned below the mold 284, and serves as a support for the confection body 310 as the latter is being removed from its mold. The removal of the confections 310 is best shown diagrammatically in Figs. 24 to 30, both inclusive.

A stationary cam bar 315 is mounted adjacent the guide rod 314, and these two members serve to guide the projecting end of the handle stick 270 downwardly into a position whereby it may be grasped by one of the clamping jaws of a pick-off conveyor. It will be noted that the guide bar 316 causes the forward end of the confection 310 to be retained in the mold 284 until after a clamping jaw of the pick-off conveyor, which will be hereinafter described, has succeeded in grasping the stick 270. This prevents movement of the confection stick 270 away from the jaws during the clamping operation and also insures proper spacing and control of the released confection until its handle stick is secured in the clamping jaws.

The pitman rod 312, which operates through the aperture 291 of the contact shoe 288 to depress the protruding end of the handle stick 270 in the first instance, is operated in timed sequence by the driving mechanism of the main conveyor through a conventional series of gear and levers (not shown). The form of the driving mechanism is of no particular importance insofar as this invention is concerned, and is well within the skill of any mechanic.

As soon as the clamping jaws 320 of the pick-off conveyor 322 are secured to the projecting end of the handle stick 270, the supporting guide rods 314 and 316 end, and the confection is free for manipulation by said jaws 320.

The pick-off conveyor 322 is shown in the form of a circular spider mechanism carrying eight pairs of circumferentially spaced clamping jaws 320 adapted to operate in synchronism with the movement of the confection molds 284 on the main conveyor. It is operated from a transverse horizontal shaft 324 driven by the chains of the main conveyor 21, through a stub shaft 326, bevel gear 328, bevel disk wheel 330, which in turn is keyed to a vertical shaft 332 mounted between bearing supports 334 and 336 (see Fig. 20). The pick-off conveyor 322 is keyed to the vertical shaft 332 and turns therewith. The clamping jaws 320 are mounted radially and pivotally on the pick-off conveyor 322 so that after grasping the protruding end of the handle stick 270 of the confection 310 from a radial position, they may fall into an axial depending position (during which they could be coated, if desired) before being released onto the delivery conveyor 42.

Referring now to Fig. 20, each pair of clamping jaws 320 consists of a solid metal base member 340, having an integrally formed and slightly tapered forward jaw member 342. A shaft 344 is mounted fixedly through the base member 340 intermediate its ends, and has a U-shaped member 346 pivotally mounted over its projecting ends. One arm 348 of the U-shaped member 346 projects a short distance above said base member 340, and is adapted to be actuated by cams for opening and closing said jaws. A stop 350 limits the movement of the arm 348 and the U-shaped member 346 with respect to the base member 340 and the shaft 344. A stick guide member 352 is welded or otherwise fastened to the forward end of the forward jaw member 342. The opposing member of the clamping jaws 320 consists of a U-shaped spring member 354, secured by machine screws 356 to the top of the base member 340. Its forward or long side extends in parallel spaced relation to the bottom side of the base member 340 and opposing jaw member 342, and is provided with an inturned clamping jaw 358, having a serrated edge adapted to pass behind the guide 352 in spring pressed engagement with the inner surface of the opposing jaw member 342 when no stick is extending therebetween. It will be noted that the position of the clamping jaws 320 is controlled by means of a circular cam track 360, which is capable of raising the series of pairs of jaws into a horizontal stick receiving position, as shown in Fig. 20, when approaching the confection molds 284 on the conveyor 21. This cam track 360 falls away, as best shown in Fig. 15, to permit the clamping jaws 320 to pivot on their axle 344, whereupon the confection 310 is swung into a depending position on its handle stick 270 for releasing onto the conveyor 42. A lever trip cam 362 engages the trip arm 348 of the clamping jaws 320 for closing the jaws on the handle stick, and a second lever trip cam 363 engages the trip arm 348 of the clamping jaws 320 for opening and releasing the confection.

*The operation of the stick type machine*

The operation of the stick type machine is substantially identical with that previously described for the bar type machine except for the stick depositor 250, the molds 284 and the confection removing or pick-off conveyor mechanism 322. One stick is positioned in the recess 296 of each mold and into the depression 294 of each contact shoe 288 as the mold passes under the stick depositor 250, the operations of which have already been described.

The mold 284 with its confection stick 270 then moves under the filling device 306, whereupon a controlled and measured charge of semi-frozen edible material is deposited therein sufficient to fill said mold. The rack or bar 300 with its pivotal segments 302 and 304 serve to hold said handle stick 270 in its desired position during the filling operation. These pivotal segments 302 and 304 serve to flex the handle stick sufficiently to eliminate any air spaces being left directly therebelow before the mold enters the refrigeration chamber. The confection is congealed as described in the bar type machine, and, when the mold emerges from the refrigeration chamber, it is inverted and passes between the electrodes 193 and 194 of the defrosting mechanism 192. They are energized in the manner described in the bar type machine, which causes a melting of the freezing bond between the congealed confection material and the inside surfaces of the mold. When this bond is melted, the confection mold has been moved under the pitman rod 312, which operates in timed sequence with the molds 284 on the conveyor 21, causing its depending arm to pass through the aperture 291 in the contact shoe 288, forcing the extreme end of the projecting handle stick 270 downwardly against the guide bar 314 and under the cam guide 315. In this manner the projecting handle stick 270 is moved into position for grasping by the clamping jaws 320 while the opposite end of the confection 310 remains within the mold 284 by the guide rod 316. This feature of maintaining the forward end of the confection in the mold 284 insures movement of the confections 310 with their respective molds 284 and also prevents movement of the handle stick away from the clamping jaws 320 during the clamping operation.

The clamping jaws 320 are forced into substantially a horizontal position as they approach the confection mold 284, guide bars 314 and 316 and guiding cam 315 by means of the raised cam track 360. The jaws 320 are open as they move into alignment with the projecting end 270 of the handle stick (see Fig. 28) and are forced into closing position by the cam trip lever 362 engaging the upwardly projecting arm 348. After the jaws 320 are closed on the handle stick 270, the movement of the pick-off conveyor 322 carries them around to a position where the cam track 360 falls away, permitting the jaws 320 to pivot on the shaft 344 through a substantially ninety degree turn into a vertical depending position. While moving in this position, the cam trip 363 strikes the upwardly projecting arm 348, opening the jaws and releasing the confection 310 onto the conveyor belt 42 for delivery to the packaging or wrapping table. It would be obvious to increase the length of the pick-off conveyor 322 whereby the confections 310 may be passed through a coating tank before being released from their depending position, as has been described in the coating of the bars in the bar type machine.

When the term "confection" is used in the specification and claims, it is intended to include the handle stick as well as the frozen edible portion, since both are formed integrally into a single unitary confectionery product, and when the word "mold" is used, it is intended to include not only the cavity in which the edible portion is frozen but also the spaced contact shoes, and especially the contact shoe having a depressed cavity for receiving the protruding end of the handle stick.

Although we have only shown and described in detail two forms of embodiment which our invention may assume, it will be apparent to those skilled in the art that the invention is not to be so limited, but that various other modifications may be made therein without departing from the spirit thereof or from the scope of the appended claims.

What we claim is:

1. In a machine for harvesting frozen products, in combination, an endless main conveyor having a plurality of open-top molds for frozen products, said conveyor operating with its molds upright during the filling operation and with its molds inverted during the removing operation, an endless second conveyor operating in synchronism with said main conveyor adjacent the inverted molds thereof, said second conveyor having engaging devices aligned with the inverted molds on the main conveyor, and means for breaking the bond between the products and their respective molds whereby they are freed for removal by the engaging devices of the second conveyor.

2. In a machine for harvesting frozen products, in combination, an endless main conveyor carrying in spaced relation a plurality of open-top molds adapted to contain frozen products, said conveyor operating with its molds upright during the filling operation and with its molds inverted during the product removing operation, an endless second conveyor operating in synchronism with said main conveyor and in juxtaposition therewith along a portion of its length where said molds are inverted, said second conveyor having engaging devices aligned with the inverted molds on the main conveyor, means for causing said devices to engage the products of said inverted molds, means for releasing the bond between the products and their respective inverted molds whereby they are freed for removal and manipulation by the engaging devices of the second conveyor, and means for releasing said products from said engaging devices.

3. In a machine for harvesting frozen products, in combination, an endless main conveyor carrying in spaced relation a plurality of open-top molds adapted to contain frozen products, said conveyor operating with its molds upright during the filling operation and with its molds inverted during the product removing operation, said molds having spaced electric contact shoes projecting therefrom, an endless second conveyor operating in synchronism with said main conveyor and in juxtaposition therewith along a portion of its length, where said molds are inverted, said second conveyor carrying spaced devices adapted to become aligned with the inverted molds of the main conveyor for engaging the products thereof, and means including spaced electrodes for engaging the contact shoes of an inverted mold for completing an electric circuit for heating said mold to release the product therefrom whereby it is free for removal and manipulation by the devices of the second conveyor.

4. In a machine for harvesting frozen products, in combination, an endless main conveyor carrying in spaced relation a plurality of open-top molds adapted to contain frozen products, said conveyor operating with its molds upright during the filling operation and with its molds inverted during the product removing operation, said molds having spaced electric contact shoes projecting therefrom, an endless second conveyor operating in synchronism with said main conveyor and in juxtaposition therewith along a portion of its length when said molds are in an inverted position, said second conveyor carrying devices synchronized with the molds of the main conveyor for engaging the products thereof, means including spaced electrodes for engaging the contact shoes of said inverted mold for completing an electric circuit for heating said mold to release the product therefrom whereby it is free for removal and manipulation by the devices of the second conveyor, and means for releasing said products from said devices.

5. In a machine for harvesting frozen products, in combination, an endless main conveyor carrying in spaced relation a plurality of open-top molds adapted to contain a frozen product, said conveyor operating with its molds upright during the filling operation and with its molds inverted during the product removing operation, said molds each carrying a pair of spaced electric contact shoes, an endless second conveyor operating in synchronism with said main conveyor and in juxtaposition therewith along a portion of its length where said molds are inverted, said second conveyor carrying devices adapted to become aligned with the inverted molds of the main conveyor for engaging the products thereof, means including spaced electrodes adjacent the main conveyor for engaging the contact shoes of said inverted molds for completing an electric circuit, means for energizing said electric circuit to heat said molds to release the products therefrom whereby they are free for removal and manipulation by the devices of the second conveyor, and means for releasing said products from said devices.

6. In a machine for harvesting a plurality of frozen products, the combination of a plurality of endless continuously operating conveyors, a series of open-top molds carried by the main conveyor having spaced electric contact shoes projecting therefrom, said conveyor operating with its molds upright during the filling operation and with its molds inverted during the product removing operation, a second conveyor operating synchronously adjacent the main conveyor along a portion of its length where said molds are operating in an inverted position, said second conveyor carrying a plurality of spaced devices each adapted to engage the product of one of the inverted molds of the main conveyor, means adjacent the second conveyor for actuating said devices to cause them to engage the products as they pass thereby, means including spaced electrodes for engaging the contact shoes of one of the inverted molds for forming an electric circuit for heating said mold to release the product therefrom whereby it is free to be removed and manipulated by its engaging device, and means for releasing said product therefrom.

7. In a machine for harvesting frozen products, in combination, a continuously operating endless main conveyor carrying a plurality of open-top molds in spaced relation adapted to contain frozen products, an endless second conveyor operating continuously in synchronism with said main conveyor and in juxtaposition therewith along a portion of its length, said second conveyor carrying devices spaced correspondingly to the molds on the main conveyor, means for causing said devices to impale the products of said molds, means adjacent the main conveyor for releasing the products from their respective molds whereby they are free for manipulation by the impaling means of the second conveyor, and means for releasing said products from said impaling means.

8. In a machine for harvesting frozen products, in combination, a continuously operating endless main conveyor carrying a plurality of open-top molds in spaced relation adapted to contain frozen products, said molds having spaced electric contact shoes projecting therefrom, an endless second conveyor operating continuously in synchronism with said main conveyor and in juxtaposition therewith along a portion of its length, said second conveyor carrying devices spaced correspondingly to the molds of the main conveyor for impaling the products thereof, and means including spaced electrodes adjacent the main conveyor for engaging the contact shoes of each mold as it passes thereby for completing an electric circuit for heating said mold to release the product therefrom whereby it is free for manipulation by the impaling means of the second conveyor.

9. In a machine for harvesting frozen products, in combination, a continuously operating endless main conveyor carrying a plurality of open-top molds in spaced relation adapted to contain frozen products, said molds having spaced electric contact shoes projecting therefrom, an endless second conveyor operating continuously in synchronism with said main conveyor and in juxtaposition therewith along a portion of its length, said second conveyor carrying devices spaced correspondingly to the molds of the main conveyor for impaling the products thereof, means including spaced electrodes adjacent the main conveyor for engaging the contact shoes of each mold as it passes thereby for completing an electric circuit for heating said mold to release the product therefrom whereby it is free for manipulation by the impaling means of the second conveyor, and means for releasing said products from said impaling means.

10. In a machine for harvesting frozen products, in combination, a continuously operating endless main conveyor carrying a plurality of open-top molds in spaced relation adapted to contain a frozen product, said molds each carrying a pair of spaced electric contact shoes, an endless second conveyor operating continuously in synchronism with said main conveyor and in juxtaposition therewith along a portion of its length, said second conveyor carrying devices spaced correspondingly to the molds of the main conveyor for impaling the products thereof, means including spaced electrodes adjacent the main conveyor for engaging the contact shoes of each mold as it passes thereby for completing an electric circuit, means for energizing said electric circuit to heat said molds to release the products therefrom whereby they are free for manipulation by the impaling means of the second conveyor, and means for releasing said products from said impaling means.

11. In a machine for harvesting a plurality of frozen products, the combination of a plurality of endless continuously operating conveyors, a series of open-top molds carried by the main conveyor having spaced electric contact shoes projecting therefrom, a second conveyor operating synchronously adjacent the main conveyor along a portion of its length, said second conveyor carrying a plurality of spaced impaling devices each adapted to impale the product of one of the molds of the main conveyor as it is being moved in juxtaposition therewith, means adjacent the second conveyor for actuating said devices to cause them to impale the products of their juxtapositioned molds as they pass thereby, means including spaced electrodes adjacent the main conveyor for engaging the contact shoes of one of the molds for forming an electric circuit for heating said mold to release the products therefrom whereby they are free to be manipulated by their impaling means, and means for withdrawing said impaling means from said products to release the same therefrom.

12. In a machine for harvesting a plurality of frozen products, the combination of a plurality of endless continuously operating conveyors, a series of open-top molds carried by the main conveyor having spaced electric contact shoes projecting from opposite ends thereof, a second conveyor synchronously operating adjacent the main conveyor along a portion of its length, said second conveyor carrying a plurality of spaced impaling devices each adapted upon actuation to impale the product of one of the molds as it is being moved in juxtaposition therewith, means adjacent said second conveyor for actuating said devices to cause them to impale the product of its juxtaposed mold, means including spaced electrodes mounted adjacent the main conveyor for engaging the contact shoes of one of the molds for closing an electric circuit, means for energizing said circuit to cause a heating of said mold to release the product therefrom, a second means for actuating said devices for withdrawing said impaling means from said products to release the same therefrom.

13. In a machine for harvesting a plurality of frozen products, the combination of a plurality of endless continuously operating conveyors, a series of open-top molds carried by the main conveyor having spaced electric contact shoes projecting from opposite sides thereof, a second conveyor synchronously operating adjacent the main conveyor along a portion of its length, said second conveyor carrying a plurality of spaced impaling devices adapted upon actuation to impale the product of its juxtapositioned mold, means adjacent the second conveyor for actuating said devices to cause them to impale the products of the molds, means including spaced electrodes adjacent the main conveyor for engaging the contact shoes of one of the molds for forming an electric circuit, means for energizing said circuit while the same is closed by one of said molds to cause a heating of the mold therein to release the product therefrom, and means for actuating said devices for releasing the product therefrom.

14. In a machine for harvesting a plurality of frozen products, in combination, an endless main conveyor having a series of spaced open-top molds adapted to operate in an upright position at least during the filling operation and in an inverted position during the product removing operation, an endless second conveyor adjacent the first conveyor along a portion of its length where the molds are in an inverted position, means carried by the second conveyor for engaging the products of the inverted molds of the first conveyor, means including an open electric circuit which is adapted to be closed by one of the inverted molds of the first conveyor passing thereby for heating the same to release the product therefrom, and means for actuating said means of the second conveyor after said product has been removed from its mold for releasing the product therefrom.

15. In a machine for harvesting a plurality of frozen products, in combination, an endless conveyor having a series of spaced open-top molds operating over upper and lower levels, each of said molds having spaced electric contact shoes, a second conveyor adjacent a portion of the lower level of the first conveyor where the molds are in an inverted position, means carried by the second conveyor for impaling the products of the inverted molds of the first conveyor, means adjacent the second conveyor for actuating said impaling means, means including spaced electrodes adjacent the first conveyor for engaging the spaced electric contact shoes of a mold as it passes thereby for completing an electric circuit, means for energizing said circuit while the same is closed by one of said molds for causing the mold to become heated sufficiently to release its product therefrom, and means adjacent the second conveyor for actuating said impaling means for releasing said product.

16. In a machine for harvesting a plurality of frozen products, in combination, an endless and continuously operating conveyor having a series of spaced open-top molds carried along upper and lower planes, the molds in the upper plane being upright and the molds in the lower plane being inverted, a pair of electric contact shoes carried by each of said molds, a second conveyor adjacent the first conveyor along a portion of its travel of its lower plane, means carried by the second conveyor for impaling the products of the inverted molds of the first conveyor, means including spaced electrodes adjacent the first conveyor intermediate said portion of its travel in juxtaposition to the second conveyor for engaging the contact shoes of a mold to cause it to complete an electric circuit, means for energizing said electric circuit while said mold is a part thereof to release the product therefrom, said conveyors diverging at said electrodes for separating the products from their respective molds, and means for actuating the impaling means to release said products.

17. In a machine for harvesting a plurality of frozen products, in combination, an endless and continuously operating conveyor having a series of spaced open-top molds, spaced electric contact shoes carried by said molds on opposite sides thereof, a second endless and continuously operating synchronous conveyor associated with the first conveyor along a portion of its length, a series of impaling devices carried by the second conveyor and spaced thereon to correspond to the spacing of the molds on the first conveyor, fixed means including a cam track adjacent the second conveyor for actuating said impaling devices to cause them to impale the products of said molds, means including fixed spaced electrodes mounted on opposite sides of the first conveyor intermediate said portion of its travel adjacent the second conveyor for receiving the contact shoes of a mold passing thereby to cause it to become part of an electric circuit, means for energizing said electric circuit while said mold is a part thereof, said conveyors diverging beyond said electrodes for removing the products from their respective molds, and means including fixed cam tracks adjacent said second conveyor for actuating said impaling devices to release said products.

18. A work holding and transferring device comprising a frame structure, a pair of spaced rods mounted on the frame structure having a plurality of fixed spaced impaling fingers projecting outwardly therefrom in a converging direction, said rods being movable with respect to said frame structure, and cam engaging means carried by said rods for moving them with respect to said frame structure for projecting or withdrawing said impaling fingers therethrough.

19. A work holding and transferring device, comprising a frame structure having spaced pairs of elongated converging slots in each end thereof, a rod slidably mounted between each pair of aligned slots, each of said rods having a series of longitudinally spaced impaling fingers projecting outwardly therefrom in substantial alignment with its elongated slots, whereby said impaling fingers project through the frame structure along a substantially common axis, and cam engaging means carried by said rods for providing means for raising and lowering them to project or withdraw the fingers from said frame structure.

20. A work holding and transferring device comprising a frame structure having spaced pairs of elongated converging slots in each end thereof, a rod slidably mounted between each pair of aligned slots, each of said rods having a series of longitudinally spaced impaling fingers projecting outwardly therefrom in substantial alignment with said slots and each other, whereby said impaling fingers project through the frame structure in spaced pairs along a substantially common longitudinal axis, cam engaging means carried by said rods for providing means for raising and lowering them in said slots, and means for locking said rods when their impaling fingers are in their projected position.

21. In a machine for harvesting frozen stick confections, in combination, an endless main conveyor carrying in spaced relation a plurality of open-top molds adapted to contain frozen confections having integrally formed and protruding handle sticks, an endless second conveyor operating in synchronism with said main conveyor and in juxtaposition therewith along a portion of its length, means adjacent the main conveyor for releasing the confections from their respective molds, means adjacent the main conveyor for forcing the protruding end of the confection handle stick away from its mold, said second conveyor carrying devices adapted to become aligned with the molds on the main conveyor, means for causing said devices to engage the handle sticks protruding from the molds of the main conveyor and thereby withdrawing the confections completely therefrom, and means for releasing said confections from said engaging devices.

22. In a machine for harvesting frozen stick confections, in combination, an endless main conveyor carrying in spaced relation a plurality of open-top molds adapted to contain frozen confections having integrally formed and protruding handle sticks, an endless second conveyor operating in synchronism with said main conveyor and in juxtaposition therewith along a portion of its length, means adjacent the main conveyor for releasing the confections from their respective molds, means adjacent the main conveyor for forcing the protruding end of the confection handle stick away from its mold, means for guiding the protruding end of said handle stick so devices carried by the second conveyor may engage the same, means for causing said devices of the second conveyor to engage the protruding handle stick of the confection in the mold of the main conveyor and withdraw the confection completely therefrom, and means for releasing said confection from said engaging devices.

23. In a machine for harvesting frozen stick confections, in combination, an operating endless main conveyor carrying in spaced relation a plurality of open-top molds adapted to contain frozen confections having protruding handle sticks, said conveyor operating with its molds upright during the filling operation and with its molds inverted during the product removing operation, said molds having spaced electric contact shoes projecting therefrom, an endless second conveyor operating in synchronism with said main conveyor and in juxtaposition therewith along a portion of its length where said molds are in an inverted position, said second conveyor carrying spaced devices adapted to become aligned with the inverted molds of the main conveyor for engaging the confection sticks thereof, means including spaced electrodes for engaging the contact shoes of each mold after a device has engaged the confection for completing an electric circuit for heating said mold to release the confection therefrom whereby it becomes free for removal and manipulation by the engaging device of the second conveyor.

24. In a machine for harvesting frozen stick confections, in combination, an endless main conveyor carrying in spaced relation a plurality of open-top molds each adapted to contain a frozen confection having a handle stick, said molds each carrying a pair of spaced electric contact shoes, one of said shoes having means for receiving a handle stick, an endless second conveyor operating in synchronism with said main conveyor and in juxtaposition therewith along a portion of its length, said second conveyor carrying devices synchronized with the molds of the main conveyor for engaging the confections by their respective handle sticks, means including spaced electrodes adjacent the main conveyor for engaging the contact shoes of each mold as it passes thereby for completing an electric circuit for heating said mold to release the confection therefrom whereby it is free for manipulation by the devices of the second conveyor, means for forcing the handle stick out of its contact shoe, means for actuating the devices of the second conveyor whereby they engage the handle stick aligned therewith, and means for actuating the devices of the second conveyor for releasing the confections therefrom.

25. In a machine for harvesting frozen stick confections, in combination, an endless main conveyor carrying in spaced relation a plurality of open-top molds each adapted to contain a frozen confection having a handle stick, said molds each carrying a pair of spaced electric contact shoes, one of said shoes having means for supporting a handle stick, means associated with said main conveyor and stick supporting shoe for maintaining said stick in position thereon during the filling operation, an endless second conveyor operating in synchronism with said main conveyor and in juxtaposition therewith along a portion of its length, said second conveyor carrying devices synchronized with the molds of the main conveyor for engaging the confections by their respective handle sticks, means including spaced electrodes adjacent the main conveyor for engaging the contact shoes of each mold as it passes thereby for completing an electric circuit for heating said mold to release the confection therefrom, means for forcing said handle stick away from its contact shoe, means for actuating the devices of the second conveyor to cause them to grasp a handle stick, and means for actuating the devices of the second conveyor for releasing the confections therefrom.

26. In a machine for harvesting frozen stick confections, in combination, an operating endless main conveyor carrying in spaced relation a plurality of open-top molds adapted to contain frozen confections having a protruding handle stick, said molds having spaced electric contact shoes projecting therefrom, one of said shoes having stick receiving means, an endless second conveyor operating in synchronism with said main conveyor and in juxtaposition therewith along a portion of its length, said second conveyor carrying spaced devices adapted to become aligned with the molds of the main conveyor for engaging the protruding confection sticks thereof, means including spaced electrodes adjacent the main conveyor for engaging the contact shoes of each mold as it passes thereby for completing an electric circuit for heating said mold to release the product therefrom, means for forcing said stick away from its contact shoe, means for guiding said stick into the jaws of the devices of the second conveyor, means for actuating said devices to engage said stick, and means for actuating said devices to release said stick.

27. In a machine for harvesting frozen stick confections, in combination, an operating endless main conveyor having in spaced relation a plurality of open-top molds adapted to contain frozen confections having handle sticks protruding therefrom, an endless second conveyor operating in synchronism with the main conveyor including a plurality of spaced devices having jaws spaced correspondingly to the handle sticks protruding from the molds of the main conveyor, means for releasing the confections from the molds of the main conveyor, means for supporting said released confections partially within its mold, means for guiding the protruding handle sticks, means for actuating the jaws of said devices to engage said guided handle sticks, and means for actuating said jaws to release said stick.

28. In a machine for harvesting frozen stick confections, in combination, an operating endless main conveyor having in spaced relation a plurality of open-top molds adapted to contain frozen confections having a handle stick protruding horizontally therefrom, an endless second conveyor operating in synchronism with the main conveyor and in juxtaposition therewith along a portion of its length, said second conveyor having pivotal devices spaced correspondingly to the handle sticks protruding from the main conveyor, means for guiding the protruding handle sticks of said confections, means for releasing said confections from the molds of the main conveyor, means for actuating said pivotal devices to cause them each to engage its aligned handle stick, means for pivoting said devices to cause said handle stick to assume a depending vertical position, and means for actuating said devices to release said handle sticks therefrom.

29. In a machine for harvesting frozen stick confections, in combination, an operating endless conveyor carrying in spaced relation a plurality of open-top molds adapted to contain frozen confections having handle sticks protruding therefrom, said conveyor operating with its molds in an upright position during the filling operation and with its molds in an inverted position during the confection removing operation, an endless second conveyor operating in synchronism with the main conveyor and in juxtaposition therewith along a portion of its length where said molds are in an inverted position, said second conveyor carrying pivotal devices spaced correspondingly to the handle sticks protruding from the inverted molds of the main conveyor, means for releasing said confections from the walls of the molds, means for retaining said released confections within their respective molds, means for actuating said devices to cause each of them to engage a protruding handle stick and remove said confection from its mold, means for causing said devices to pivot through substantially a ninety degree turn to change the position of said confections, and means for actuating said devices to release said confections therefrom.

30. In a machine for harvesting frozen stick confections, in combination, an operating endless conveyor having in spaced relation a plurality of open-top molds adapted to contain frozen confections having handle sticks protruding therefrom, an endless second conveyor operating in synchronism with said main conveyor and in juxtaposition therewith along a portion of its length, said second conveyor carrying a plurality of spaced pivotal devices having actuating jaws spaced correspondingly to the handle sticks protruding from the molds of the main conveyor, means for releasing said confections from the walls of their molds, means for guiding the protruding handle sticks of the released confections, means for actuating said jaws to cause them to engage a guided handle stick and remove said confection from its mold, means for pivoting said devices to change the position of said confection, and means for actuating said jaws to release said confection therefrom.

31. In a machine for harvesting frozen stick confections, in combination, an operating endless main conveyor carrying in spaced relation a plurality of open-top substantially horizontal molds adapted to contain frozen confections having handle sticks protruding laterally therefrom, said main conveyor operating with its molds upright during the filling operation and with its molds inverted during the confection removing operation, an endless second conveyor operating in synchronism with said main conveyor and in juxtaposition therewith along a portion of its length where said molds are in an inverted position, means for releasing said confections from said molds while they are in an inverted position, means for preventing said released confections from dropping free of said inverted molds, said second conveyor carrying a plurality of spaced pivotal devices having actuating jaws to engage protruding handle sticks, means for removing said confection from its mold after its handle stick is secured in said jaws, means for causing said devices to pivot from a horizontal to a vertical position so that said confection will depend therebelow, and means for actuating said jaws to release said confection.

ROBERT F. EDDY.
ALLAN F. EDDY.

REFERENCES CITED

The following references are of record in the file of this patent:

UNITED STATES PATENTS

| Number | Name | Date |
|---|---|---|
| 1,226,910 | Reed | May 22, 1917 |
| 1,345,634 | Raymond | July 6, 1920 |
| 1,883,482 | Bausman | Oct. 18, 1932 |
| 1,936,584 | Cobb | Nov. 28, 1933 |
| 1,960,456 | Robb | May 29, 1934 |
| 2,109,822 | Eddy | Mar. 1, 1938 |